United States Patent [19]

Willis

[11] Patent Number: 5,374,963
[45] Date of Patent: Dec. 20, 1994

[54] PICTURE RESOLUTION ENHANCEMENT WITH DITHERING AND DEDITHERING

[75] Inventor: Donald H. Willis, Indianapolis, Ind.

[73] Assignee: Thomson Consumer Electronics, Inc., Indianapolis, Ind.

[21] Appl. No.: 940,904

[22] PCT Filed: May 29, 1991

[86] PCT No.: PCT/US91/03743

§ 371 Date: Oct. 28, 1992

§ 102(e) Date: Oct. 28, 1992

[30] Foreign Application Priority Data

Jun. 1, 1990 [GB] United Kingdom ............... 9012326

[51] Int. Cl.⁵ ............................................. H04N 5/262
[52] U.S. Cl. ............................... 348/564; 348/625
[58] Field of Search ............. 358/457, 456, 160, 166, 358/138, 230; 348/574, 564, 625; H04N 5/262

[56] References Cited

U.S. PATENT DOCUMENTS

| | | | |
|---|---|---|---|
| 4,524,447 | 6/1985 | Willis et al. | 375/26 |
| 4,556,900 | 12/1985 | Willis | 358/23 |
| 4,594,726 | 6/1986 | Willis | 375/26 |
| 4,605,963 | 8/1986 | Reitmeier et al. | 358/141 |
| 4,652,908 | 3/1987 | Fling et al. | 358/37 |
| 4,654,695 | 3/1987 | Fling | 358/11 |
| 4,656,515 | 4/1987 | Christopher | 358/183 |
| 4,656,516 | 4/1987 | Fling et al. | 358/183 |
| 4,668,989 | 5/1987 | Mackereth | 358/182 |
| 4,707,742 | 11/1987 | Field et al. | 358/183 |
| 4,758,893 | 7/1988 | Lippel | 358/209 |
| 4,827,343 | 5/1989 | Naimpally | 348/574 X |
| 4,887,157 | 12/1989 | Hartnack et al. | 358/133 |
| 4,916,544 | 4/1990 | Lienard et al. | 358/262.1 |
| 4,956,638 | 9/1990 | Larky et al. | 358/457 X |
| 4,965,668 | 10/1990 | Abt et al. | 358/160 |
| 5,148,163 | 9/1992 | Frindle | 341/131 |
| 5,166,809 | 11/1992 | Surbrook | 358/456 |

Primary Examiner—Victor R. Kostak
Attorney, Agent, or Firm—Joseph S. Tripoli; Joseph J. Laks; Harvey D. Fried

[57] ABSTRACT

A dithering technique in accordance with an inventive arrangement saves two bits per sample in a wideband video signal. In accordance with this arrangement, a dither signal is added to an n-bit video signal. The adder should include a limiter to avoid overflows. The samples are truncated after the addition. In truncation, the least significant two bits are simply discarded. Usually, dither values are small positive integers which tend to increase the DC content of the signal. A dither signal which can provide significant improvement in a sub-sampled signal is a two frequency dither in which the higher frequency has the higher amplitude. The dither signal can have any repetitive sequence of the numbers 0, 1, 2, 3 in any order within said sequence, for example, 0, 2, 1, 3, 0, 2, 1, 3, . . . , etc. The quarter-frequency component is usually more objectionable than the half-frequency component, even though the quarter-frequency component has half the amplitude of the half-frequency component. Accordingly, a dedithering scheme can be chosen to suppress only the quarter-frequency component. A first signal path of the dedithering circuit is for delay and amplitude matching. A second signal path includes a combination inverted bandpass filter and limiter. The inverted bandpass filter cancels the frequency at the center of the passband when added to the delay and amplitude matched original signal. The limiter assures that only amplitudes of dither size will be cancelled.

18 Claims, 17 Drawing Sheets

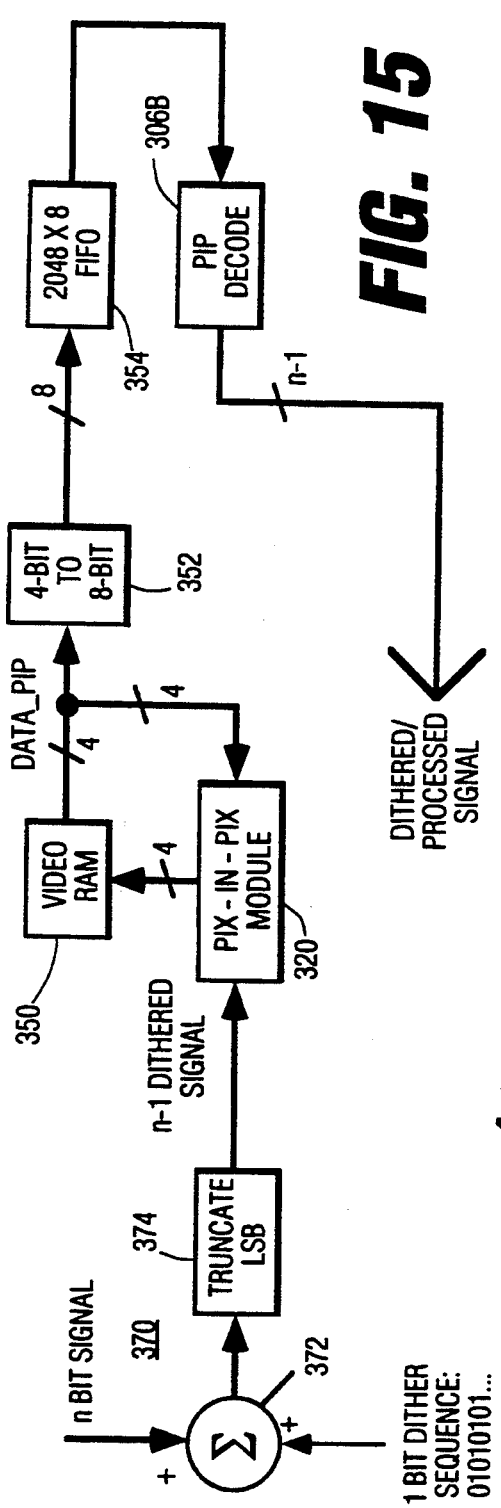
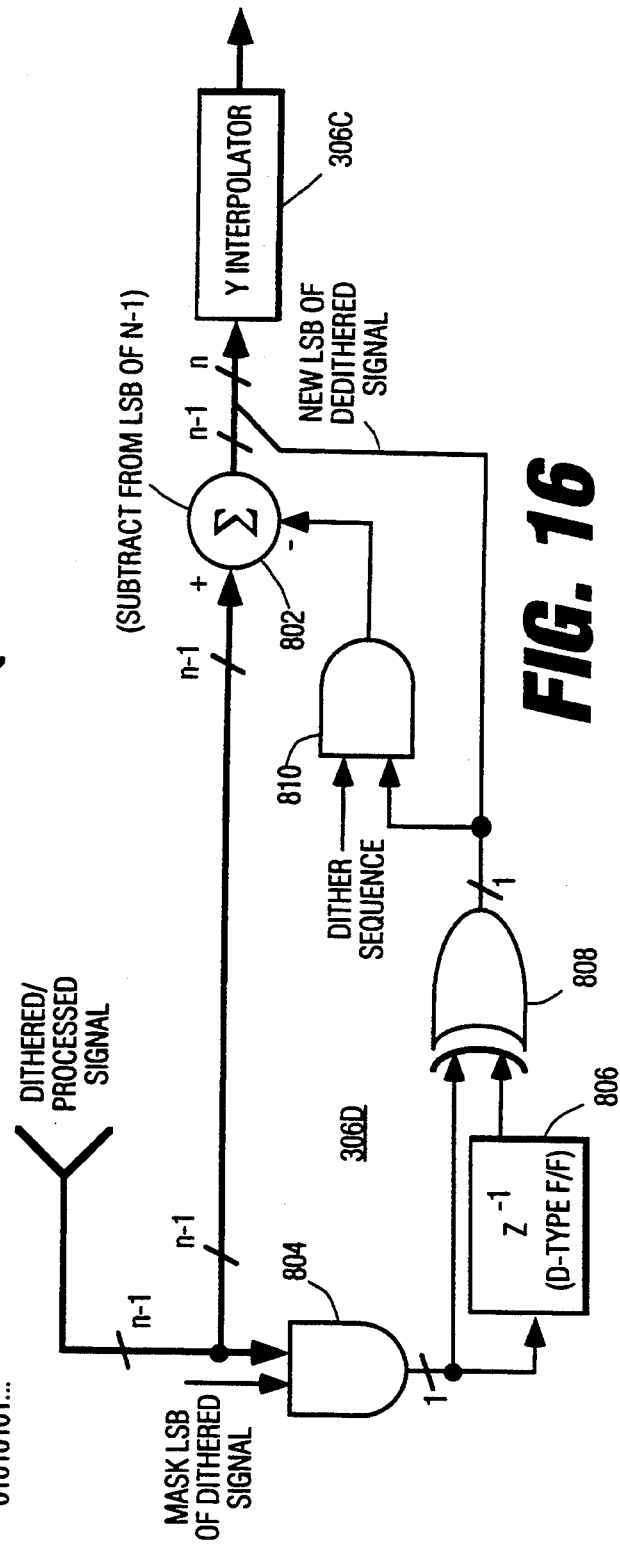
FIG. 15
FIG. 16

| FIELD | LINE | 1-BIT DITHER 1 PIXEL SKEW | 2-BIT DITHER 1 PIXEL SKEW | 2-BIT DITHER 2 PIXEL SKEW |
|---|---|---|---|---|
| 1 | 1   | 0 1 0 1 0 1 0 1 . . . | 0 2 1 3 0 2 1 3 . . . | 0 2 1 3 0 2 1 3 . . . |
| 2 | 264 | 1 0 1 0 1 0 1 0 . . . | 3 0 2 1 3 0 2 1 . . . | 1 3 0 2 1 3 0 2 . . . |
| 1 | 2   | 0 1 0 1 0 1 0 1 . . . | 0 2 1 3 0 2 1 3 . . . | 0 2 1 3 0 2 1 3 . . . |
| 2 | 265 | 1 0 1 0 1 0 1 0 . . . | 3 0 2 1 3 0 2 1 . . . | 1 3 0 2 1 3 0 2 . . . |
| 1 | 3   | 0 1 0 1 0 1 0 1 . . . | 0 2 1 3 0 2 1 3 . . . | 0 2 1 3 0 2 1 3 . . . |
| 2 | 266 | 1 0 1 0 1 0 1 0 . . . | 3 0 2 1 3 0 2 1 . . . | 1 3 0 2 1 3 0 2 . . . |

FIG. 19

PICTURE RESOLUTION ENHANCEMENT WITH DITHERING AND DEDITHERING

BACKGROUND OF THE INVENTION

1. Field of the Invention

The invention relates to the field of televisions capable of displaying side by side pictures of substantially equal size and comparable picture quality from different sources, and in particular, to such televisions having a wide display format ratio screen. Most televisions today have a format display ratio, horizontal width to vertical height, of 4:3. A wide format display ratio corresponds more closely to the display format ratio of movies, for example 16:9. The invention is applicable to both direct view televisions and projection televisions.

2. Description of Related Art

Televisions having a format display ratio of 4:3, often referred to as 4×3, are limited in the ways that single and multiple video signal sources can be displayed. Television signal transmissions of commercial broadcasters, except for experimental material, are broadcast with a 4×3 format display ratio. Many viewers find the 4×3 display format less pleasing than the wider format display ratio associated with the movies. Televisions with a wide format display ratio provide not only a more pleasing display, but are capable of displaying wide display format signal sources in a corresponding wide display format. Movies "look" like movies, not cropped or distorted versions thereof. The video source need not be cropped, either when converted from film to video, for example with a telecine device, or by processors in the television.

Televisions with a wide display format ratio are also suited to a wide variety of displays for both conventional and wide display format signals, as well as combinations thereof in multiple picture displays. However, the use of a wide display ratio screen entails numerous problems. Changing the display format ratios of multiple signal sources, developing consistent timing signals from asynchronous but simultaneously displayed sources, switching between multiple sources to generate multiple picture displays, and providing high resolution pictures from compressed data signals are general categories of such problems. A wide screen television according to various inventive arrangements is capable of providing high resolution, single and multiple picture displays, from single and multiple sources having similar or different format ratios, and with selectable display format ratios. This invention is directed in particular to providing high resolution pictures from compressed data signals.

Television apparatus with conventional format display ratios can be equipped for displaying multiple pictures, for example from two video sources. The video sources may be the tuner in the television, a tuner in a video cassette recorder, a video camera, and others. In a mode often referred to as picture-in-picture (PIP), the tuner in the television provides a picture filling most of the screen, or display area, and an auxiliary video source provides a small inset picture generally within the boundaries of the larger picture. A PIP display mode in a wide screen television apparatus is shown in FIG. 1(c). In many instances, the inset picture can be positioned in a number of different locations. Another display mode is often referred to as channel scan, wherein a large number of small pictures, each from a different channel source, fill the screen in a freeze frame montage. There is no main picture, at least in terms of size. A channel scan display mode in a wide screen television apparatus is shown in FIG. 1(i). In wide screen television apparatus, other display modes are possible. One is referred to as picture-outside-picture (POP). In this mode, several inset auxiliary pictures can share a common boundary with a main picture. A POP display mode in a wide screen television apparatus is shown in FIG. 1(f). another mode particularly suited for a wide screen television is side by side pictures of substantially the same size, from different video sources, for example two different channels. This mode is illustrated for a wide screen television in FIG. 1(d) for two 4:3 video sources. It will be appreciated that this mode can be considered a special case of the POP mode.

The synchronization of asynchronous video signals often requires that successive fields of one of the signals be stored in one or more field memories. Limitations on memory space can impose a need to compress the data of the stored signal to enable storage in limited capacity field memories, or a need to sample the data at a lower sampling rate than the other video signal. This can result in lower quantization resolution for the stored video signal when the pictures are displayed, particularly if the stored picture is larger than a typically small PIP or POP. In the side by side picture mode described above, where the main and auxiliary video signals are displayed side by side, and with equal size, a lower quantization resolution in the auxiliary picture can be apparent from even a casual comparison of the two pictures. It would be desirable for pictures from different video sources to be displayed side by side, for example on a wide screen television, with substantially comparable picture quality, even when one of the signals has a lower quantization resolution.

SUMMARY OF THE INVENTION

In accordance with inventive arrangements, one of a plurality of resolution enhancing schemes may be selected for optimum picture quality under different circumstances. These schemes include dithering, dithering and dedithering, skewing of dither sequences and paired pixel replacement and reconstruction. Dithering techniques for saving bits in digital video signals have been described, for example in U.S. Pat. No. 4,594,726 - Willis. Usually, these schemes try to save one bit per sample in a wideband signal or several bits per sample in a narrow band signal which is carried in a wideband video signal.

A dithering technique in accordance with an inventive arrangement saves two bits per sample in a wideband video signal. In accordance with this arrangement, a dither signal is added to an n-bit video signal. The adder should include a limiter to avoid overflows. The samples are truncated after the addition. In truncation, the least significant two bits are simply discarded. Usually, dither values are small positive integers which tend to increase the DC content of the signal. Truncation tends to decrease the DC content, and indeed, the dither signal is usually developed to cancel the increase with the decrease. A dither signal which can provide significant improvement in a subsampled signal is a two frequency dither in which the higher frequency has the higher amplitude. In accordance with an inventive arrangement, the dither signal can be defined by any repetitive sequence of the numbers 0, 1, 2, 3 in any order within the sequence. One such dither sequence is:

0, 2, 1, 3, 0, 2, 1, 3, ..., etc.

This dither sequence is the sum of two other sequence, namely:

0, 2, 0, 2, 0, 2, 0, 2, ..., etc.; and, 0, 0, 1, 1, 0, 0, 1, 1, ..., etc.

The choice of dithering with 0, 2, 1, 3, 0, 2, 1, 3, ..., etc., for example, is based on the conclusion that a higher frequency dither is less noticeable than a lower frequency dither.

It appears that the quarter-frequency component is usually more objectionable than the half-frequency component, even though the quarter-frequency component has half the amplitude of the half-frequency component. Accordingly, a dedithering scheme can be chosen to suppress only the quarter-frequency component. A first signal path of the dedithering circuit is for delay and amplitude matching. A second signal path includes a combination inverted bandpass filter and limiter. The inverted bandpass filter cancels the frequency at the center of the passband when added to the delay and amplitude matched original signal. The limiter assures that only amplitudes of dither size will be cancelled. This dedithering arrangement has no effect upon the half sample frequency component of the dithered signal. The half-frequency signal component is low enough in amplitude and high enough in frequency, for example, at the Nyquist limit of the signal, to have sufficiently low visibility to avoid causing a problem.

BRIEF DESCRIPTION OF THE DRAWINGS

FIGS. 15 and 16 are block diagrams for 1-bit dithering and dedithering circuits respectively, for implementing the resolution processing circuits of FIG. 4 and FIG. 10.

FIG. 19 is a table useful for explaining a skewing scheme for enhancing operation of the circuits shown in FIGS. 15-18.

DETAILED DESCRIPTION OF THE PREFERRED EMBODIMENTS

The various parts of FIG. 1 illustrate some, but not all of the various combinations of single and multiple picture display formats which can be implemented according to different inventive arrangements. Those selected for illustration are intended to facilitate the description of particular circuits comprising wide screen televisions according to the inventive arrangements. For purposes of convenience in illustration and discussion herein, a conventional display format ratio of width to height for a video source or signal is generally deemed to be 4×3, whereas a wide screen display format ratio of width to height for a video source or signal is generally deemed to be 16×9. The inventive arrangements are not limited by these definitions.

Figure 1C:
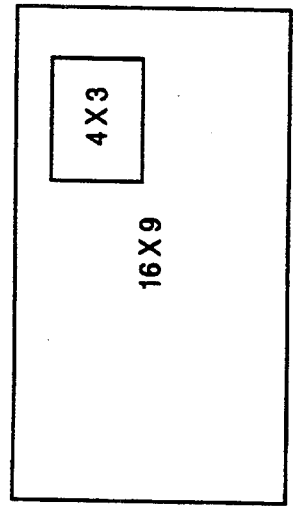
FIGS 1(a)-1i) are useful for explaining different display formats of a wide screen television.
Figure 1F:
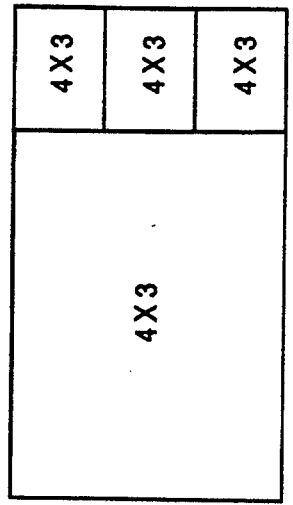
Figure 1I:
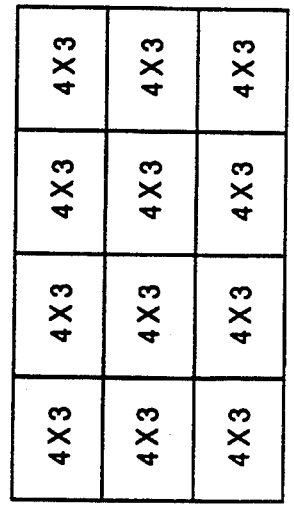
Figure 1B:
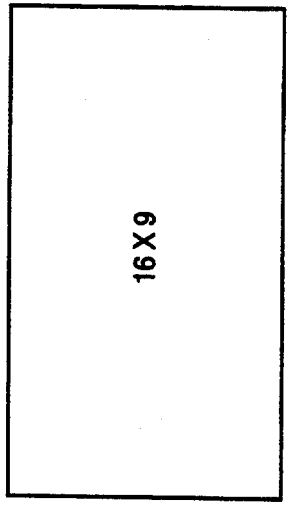
Figure 1E:
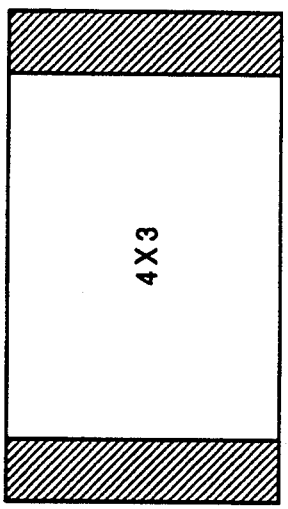
Figure 1H:
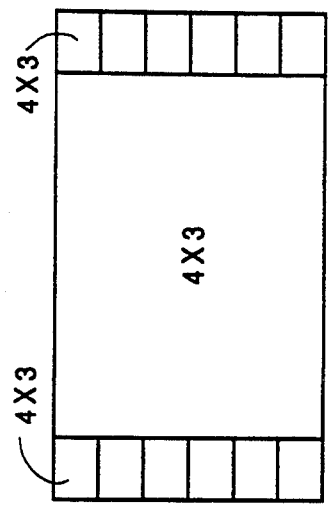
Figure 1A:
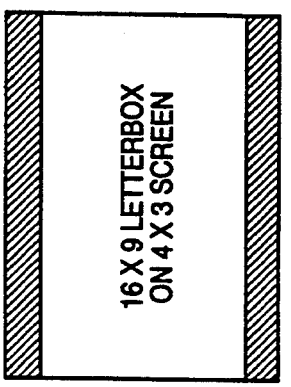

FIG. 1(a) illustrates a television, direct view or projection, having a conventional format display ratio of 4×3. When a 16×9 format display ratio picture is transmitted, as a 4×3 format display ratio signal, black bars appear at the top and at the bottom. This is commonly referred to as letterbox format. In this instance, the viewed picture is rather small with respect to the entire available display area. Alternatively, the 16×9 format display ratio source is converted prior to transmission, so that it will fill the vertical extent of a viewing surface of 4×3 format display. However, much information will be cropped from the left and/or right sides. As a further alternative, the letterbox picture can be expanded vertically but not horizontally, whereby the resulting picture will evidence distortion by vertical elongation. None of the three alternatives is particularly appealing.

FIG. 1(b) shows a 16×9 screen. A 16×9 format display ratio video source would be fully displayed, without cropping and without distortion. A 16×9 format display ratio letterbox picture, which is itself in a 4×3 format display ratio signal, can be progressively scanned by line doubling or line addition, so as to provide a larger display with sufficient vertical resolution. A wide screen television in accordance with this invention can display such a 16×9 format display ratio signal whether the main source, the auxiliary source or an external RGB source.

FIG. 1(c) illustrates a 16×9 format display ratio main signal in which a 4×3 format display ratio inset picture is displayed. If both the main and auxiliary video signals are 16×9 format display ratio sources, the inset picture can also have a 16×9 format display ratio. The inset picture can be displayed in many different positions.

Figure 1D:
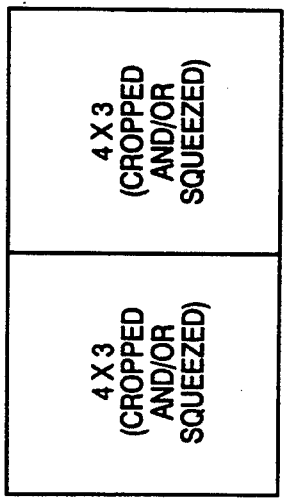

FIG. 1(d) illustrates a display format, wherein the main and auxiliary video signals are displayed with the same size picture. Each display area has an format display ratio of 8×9, which is of course different from both 16×9 and 4×3. In order to show a 4×3 format display ratio source in such a display area, without horizontal or vertical distortion, the signal must be cropped on the left and/or right sides. More of the picture can be shown, with less cropping, if some aspect ratio distortion by horizontal squeezing of the picture is tolerated. Horizontal squeezing results in vertical elongation of objects in the picture. The wide screen television according to this invention can provide any mix of cropping and aspect ratio distortion from maximum cropping with no aspect ratio distortion to no cropping with maximum aspect ratio distortion.

Data sampling limitations in the auxiliary video signal processing path complicate the generation of a high resolution picture which is as large in size as the display from the main video signal. Various methods can be developed for overcoming these complications.

FIG. 1(e) is a display format wherein a 4×3 format display ratio picture is displayed in the center of a 16×9 format display ratio screen. Dark bars are evident on the right and left sides.

Figure 1G:
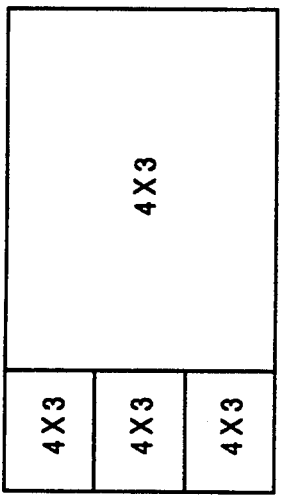

FIG. 1(f) illustrates a display format wherein one large 4×3 format display ratio picture and three smaller 4×3 format display ratio pictures are displayed simultaneously. A smaller picture outside the perimeter of the large picture is sometimes referred to as a POP, that is a picture-outside-picture, rather than a PIP, a picture-in-picture. The terms PIP or picture-in-picture are used herein for both display formats. In those circumstances where the wide screen television is provided with two tuners, either both internal or one internal and one external, for example in a video cassette recorder, two of the displayed pictures can display movement in real time in accordance with the source. The remaining pictures can be displayed in freeze frame format. It will be appreciated that the addition of further tuners and additional auxiliary signal processing paths can provide for more than two moving pictures. It will also be appreciated that the large picture on the one hand, and the three small pictures on the other hand, can be switched in position, as shown in FIG. 1(g).

FIG. 1(h) illustrates an alternative wherein the 4×3 format display ratio picture is centered, and six smaller 4×3 format display ratio pictures are displayed in vertical columns on either side. As in the previously described format, a wide screen television provided with two tuners can provide two moving pictures. The remaining eleven pictures will be in freeze frame format.

FIG. 1(i) shows a display format having a grid of twelve 4×3 format display ratio pictures. Such a display format is particularly appropriate for a channel selection guide, wherein each picture is at least a freeze frame from a different channel. As before, the number of moving pictures will depend upon the number of available tuners and signal processing paths.

The various formats shown in FIG. 1 are illustrative, and not limiting, and can be implemented by wide screen televisions shown in the remaining drawings and described in detail below.

Figure 2:
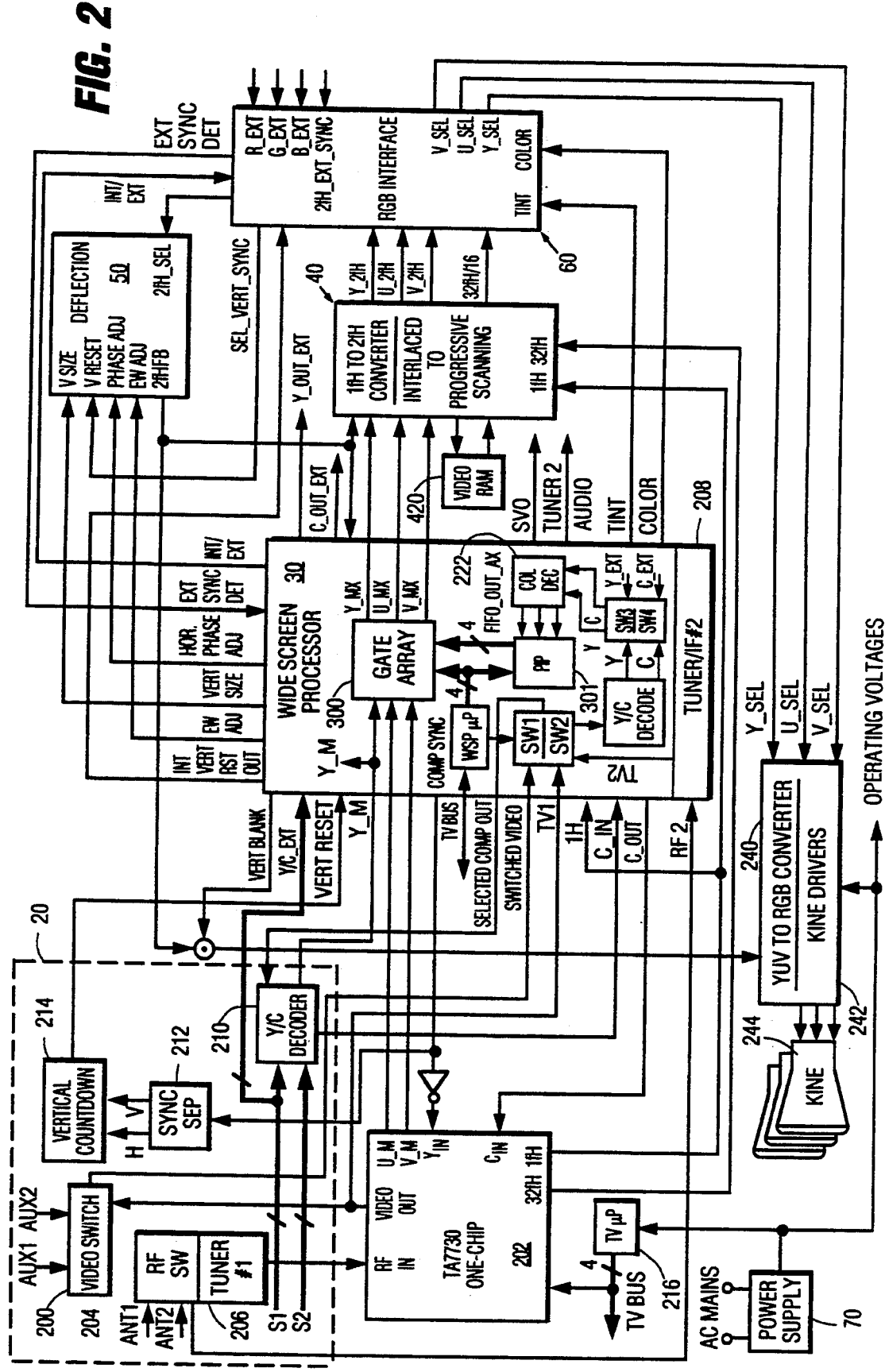
FIG. 2 is a block diagram of a wide screen television in accordance with aspects of this invention and adapted for operation at 2 $f_H$ horizontal scanning.

An overall block diagram for a wide screen television in accordance with inventive arrangements, and adapted to operate with 2 $f_H$ horizontal scanning, is shown in FIG. 2 and generally designated 10. The television 10 generally comprises a video signals input section 20, a chassis or TV microprocessor 216, a wide screen processor 30, a 1 $f_H$ to 2 $f_H$ converter 40, a deflection circuit 50, an RGB interface 60, a YUV to RGB converter 240, kine drivers 242, direct view or projection tubes 244 and a power supply 70. The grouping of various circuits into different functional blocks is made for purposes of convenience in description, and is not intended as limiting the physical position of such circuits relative to one another.

The video signals input section 20 is adapted for receiving a plurality of composite video signals from different video sources. The video signals may be selectively switched for display as main and auxiliary video signals. An RF switch 204 has two antenna inputs ANT1 and ANT 2. These represent inputs for both off-air antenna reception and cable reception. The RF switch 204 controls which antenna input is supplied to a first tuner 206 and to a second tuner 208. The output of first tuner 206 is an input to a one-chip 202, which performs a number of functions related to tuning, horizontal and vertical deflection and video controls. The particular one-chip shown in industry designated type TA7730. The baseband video signal VIDEO OUT developed in the one-chip and resulting from the signal from first tuner 206 is an input to both video switch 200 and the TV1 input of wide screen processor 30. Other baseband video inputs to video switch 200 are designated AUX1 and AUX 2. These might be used for video cameras, laser disc players, video tape players, video games and the like. The output of the video switch 200, which is controlled by the chassis or TV microprocessor 216 is designated SWITCHED VIDEO. The SWITCHED VIDEO is another input to wide screen processor 30.

Figure 3:
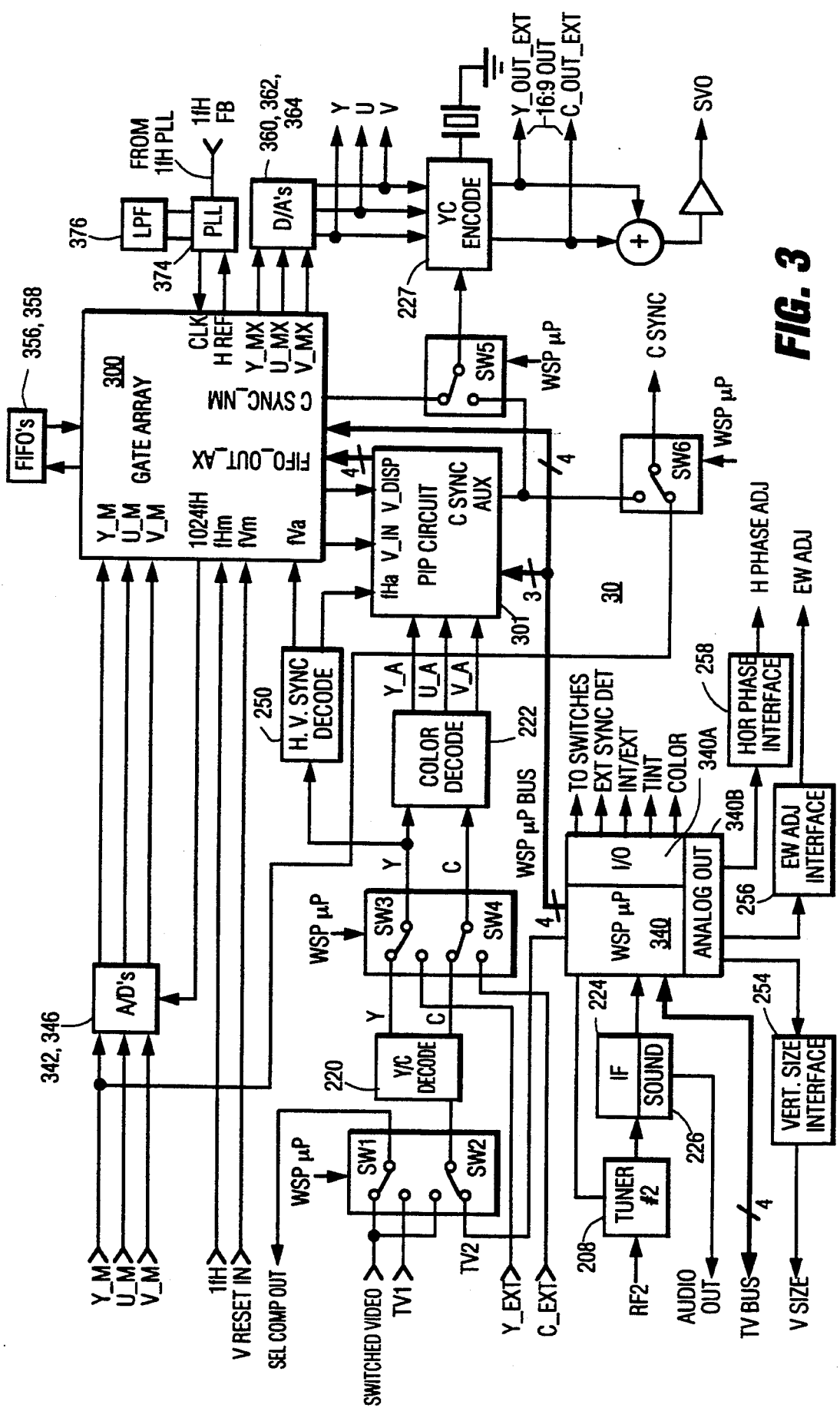
FIG. 3 is a block diagram of the wide screen processor shown in FIG. 2.

With further reference to FIG. 3, a switch SW1 wide screen processor selects between the TV1 and SWITCHED VIDEO signals as a SEL COMP OUT video signal which is an input to a Y/C decoder 210. The Y/C decoder 210 may be implemented as an adaptive line comb filter. Two further video sources S1 and S2 are also inputs to the Y/C decoder 210. Each of S1 and S2 represent different S-VHS sources, and each consists of separate luminance and chrominance signals. A switch, which may be incorporated as part of the Y/C decoder, as in some adaptive line comb filters, or which may be implemented as a separate switch, is responsive to the TV microprocessor 216 for selecting one pair of luminance and chrominance signals as outputs designated $Y_{13}$ M and $C_{13}$ IN respectively. The selected pair of luminance and chrominance signals is thereafter considered the main signal and is processed along a main signal path. Signal designations including $_{13}$ M or _MN refer to the main signal path. The chrominance signal $C_{13}$ IN is redirected by the wide screen processor back to the one-chip, for developing color difference signals $U_{13}$ M and $V_{13}$ M. In this regard, U is an equivalent designation for (R-Y) and V is an equivalent designation for (B-Y). The Y_M, U_M, and V_M signals are converted to digital form in the wide screen processor for further signal processing.

The second tuner 208, functionally defined as part of the wide screen processor 30, develops a baseband video signal TV2. A switch SW2 selects between the TV2 and SWITCHED VIDEO signals as an input to a Y/C decoder 220. The Y/C decoder 220 may be implemented as an adaptive line comb filter. Switches SW3 and SW4 select between the luminance and chrominance outputs of Y/C decoder 220 and the luminance and chrominance signals of an external video source, designated Y_EXT and C_EXT respectively. The Y_EXT and C_EXT signals correspond to the S-VHS input S1. The Y/C decoder 220 and switches SW3 and SW4 may be combined, as in some adaptive line comb filters. The output of switches SW3 and SW4 is thereafter considered the auxiliary signal and is processed along an auxiliary signal path. The selected luminance output is designated Y—A. Signal designations including —A, —AX and —AUX refer to the auxiliary signal path. The selected chrominance is converted to color difference signals U—A and V—A. The Y—A, U—A and V—A signals are converted to digital form for further signal processing. The arrangement of video signal source switching in the main and auxiliary signal paths maximizes flexibility in managing the source selection for the different parts of the different picture display formats.

A composite synchronizing signal COMP SYNC, corresponding to Y—M is provided by the wide screen processor to a sync separator 212. The horizontal and vertical synchronizing components H and V respectively are inputs to a vertical countdown circuit 214. The vertical countdown circuit develops a VERTICAL RESET signal which is directed into the wide screen processor 30. The wide screen processor generates an internal vertical reset output signal INT VERT RST OUT directed to the RGB interface 60. A switch in the RGB interface 60 selects between the internal vertical reset output signal and the vertical synchronizing component of the external RGB source. The output of this switch is a selected vertical synchronizing component SEL—VERT—SYNC directed to the deflection circuit 50. Horizontal and vertical synchronizing signals of the auxiliary video signal are developed by sync separator 250 in the wide screen processor.

The 1 $f_H$ to 2 $f_H$ converter 40 is responsible for converting interlaced video signals to progressively scanned noninterlaced signals, for example one wherein each horizontal line is displayed twice, or an additional set of horizontal lines is generated by interpolating adjacent horizontal lines of the same field. In some instances, the use of a previous line or the use of an interpolated line will depend upon the level of movement which is detected between adjacent fields or frames. The converter circuit 40 operates in conjunction with a video RAM 420. The video RAM may be used to store one or more fields of a frame, to enable the progressive display. The converted video data as Y—2 $f_H$, U—2 $f_H$ and V—2 $f_H$ signals is supplied to the RGB interface 60.

Figure 14:
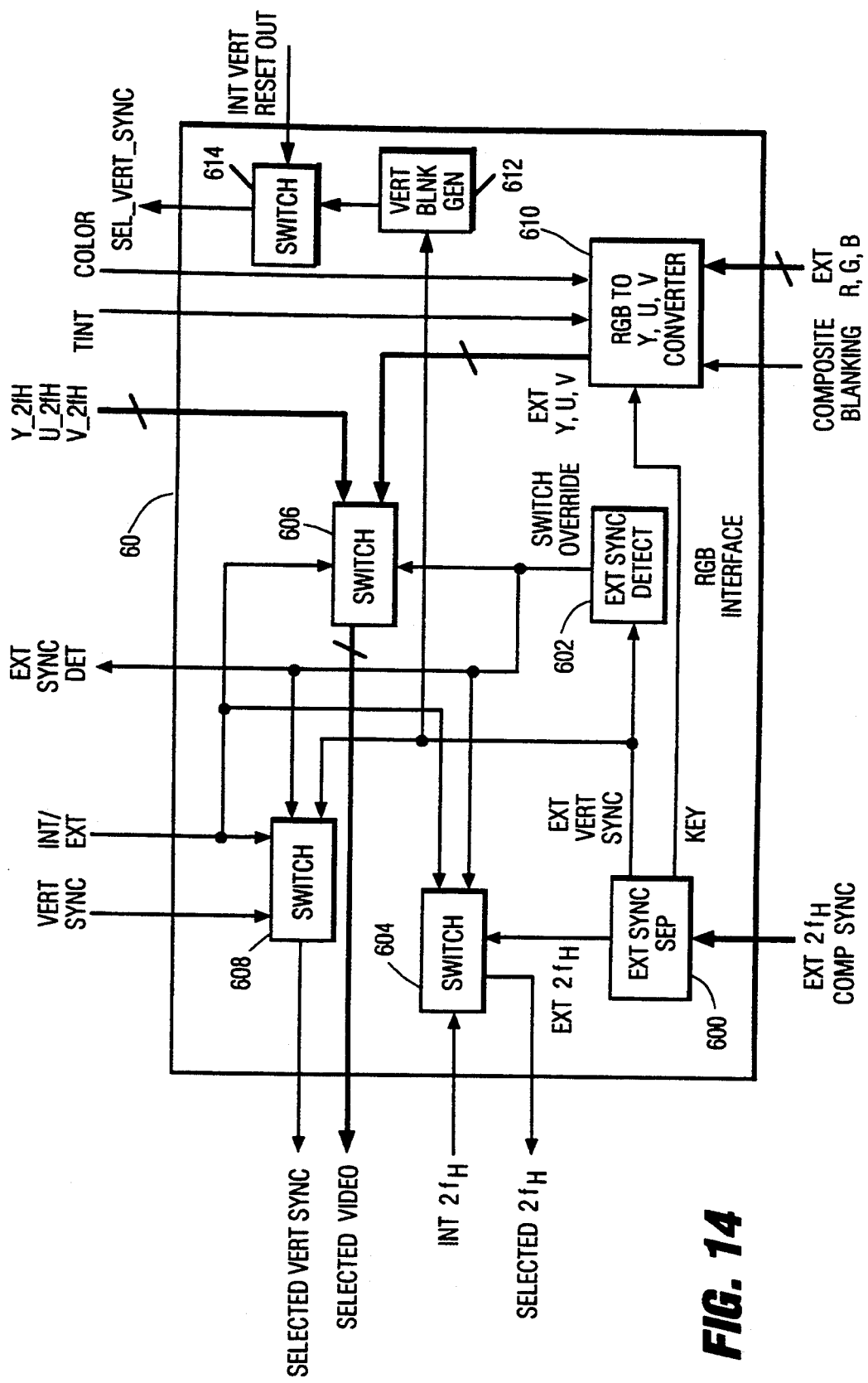
FIG. 14 is a block diagram of the RGB interface shown in FIG. 2.

The RGB interface 60, shown in more detail in FIG. 14, enables selection of the converted video data or external RGB video data for display by the video signals input section. The external RGB signal is deemed to be a wide format display ratio signal adapted for 2 $f_H$ scanning. The vertical synchronizing component of the main signal is supplied to the RGB interface by the wide screen processor as INT VERT RST OUT, enabling a selected vertical sync ($f_{Vm}$ or $f_{Vext}$) to be available to the deflection circuit 50. Operation of the wide screen television enables user selection of an external RGB signal, by generating an internal/external control signal INT/EXT. However, the selection of an external RGB signal input, in the absence of such a signal, can result in vertical collapse of the raster, and damage to the cathode ray tube or projection tubes. Accordingly, the RGB interface circuit detects an external synchronizing signal, in order to override the selection of a non-existent external RGB input. The WSP microprocessor 340 also supplies color and tint controls for the external RGB signal.

The wide screen processor 30 comprises a picture in picture processor 320 for special signal processing of the auxiliary video signal. The term picture-in-picture is sometimes abbreviated as PIP or pix-in-pix. A gate array 300 combines the main and auxiliary video signal data in a wide variety of display formats, as shown by the examples of FIGS. 1(b) through 1(i). The picture-in-picture processor 320 and gate array 300 are under the control of a wide screen microprocessor (WSP $\mu$P) 340. Microprocessor 340 is responsive to the TV microprocessor 216 over a serial bus. The serial bus includes four signal lines, for data, clock signals, enable signals and reset signals. The wide screen processor 30 also generates a composite vertical blanking/reset signal, as a three level sandcastle signal. Alternatively, the vertical blanking and reset signals can be generated as separate signals. A composite blanking signal is supplied by the video signal input section to the RGB interface.

Figure 13:
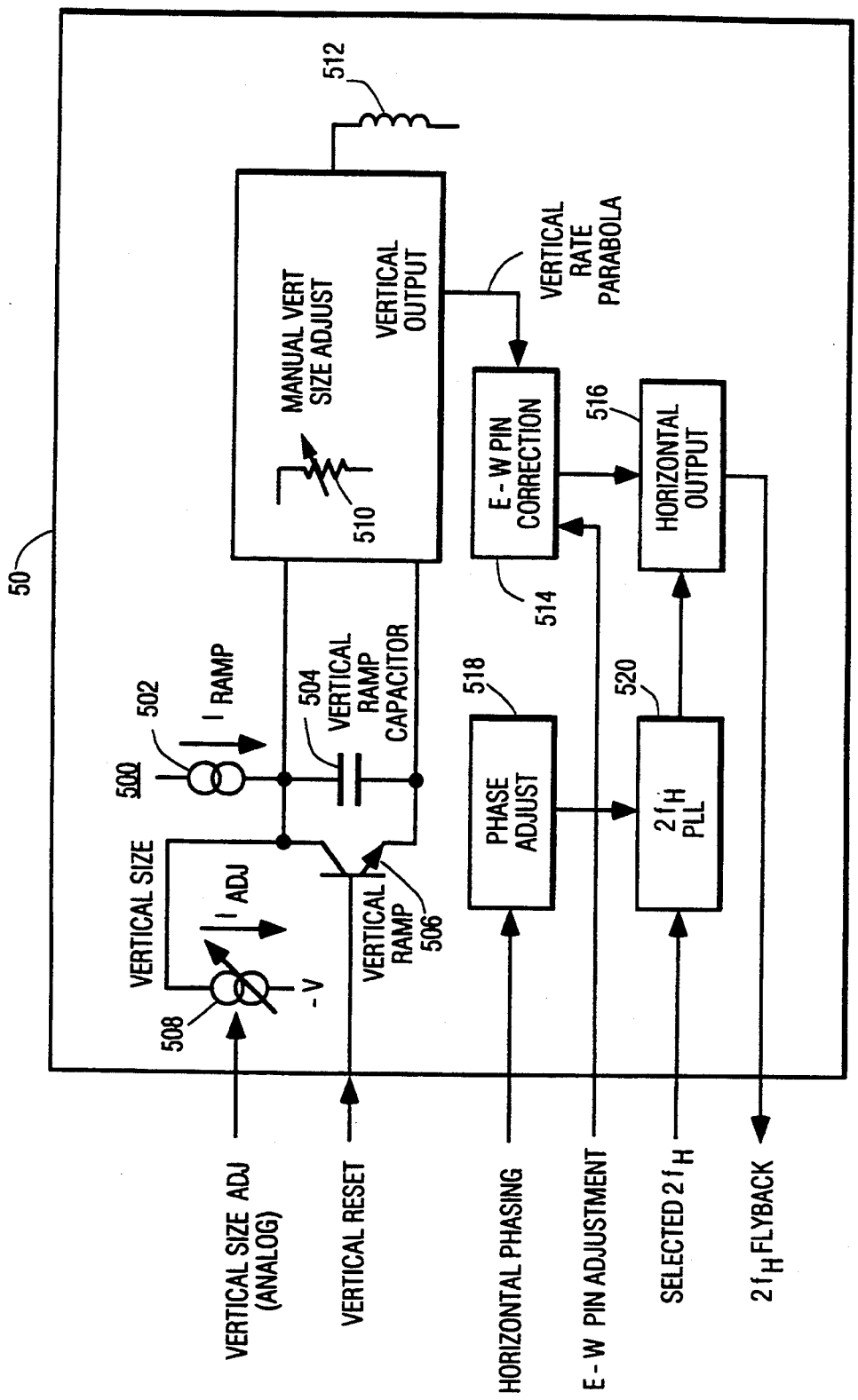
FIG. 13 is a combination block and circuit diagram for the deflection circuit shown in FIG. 2.

The deflection circuit 50, shown in more detail in FIG. 13, receives a vertical reset signal from the wide screen processor, a selected 2 $f_H$ horizontal synchronizing signal from the RGB interface 60 and additional control signals from the wide screen processor. These additional control signals relate to horizontal phasing, vertical size adjustment and east-west pin adjustment. The deflection circuit 50 supplies 2 $f_H$ flyback pulses to the wide screen processor 30, the 1 $f_H$ to 2 $f_H$ converter 40 and the YUV to RGB converter 240.

Operating voltages for the entire wide screen television are generated by a power supply 70 which can be energized by an AC mains supply.

Figure 4:
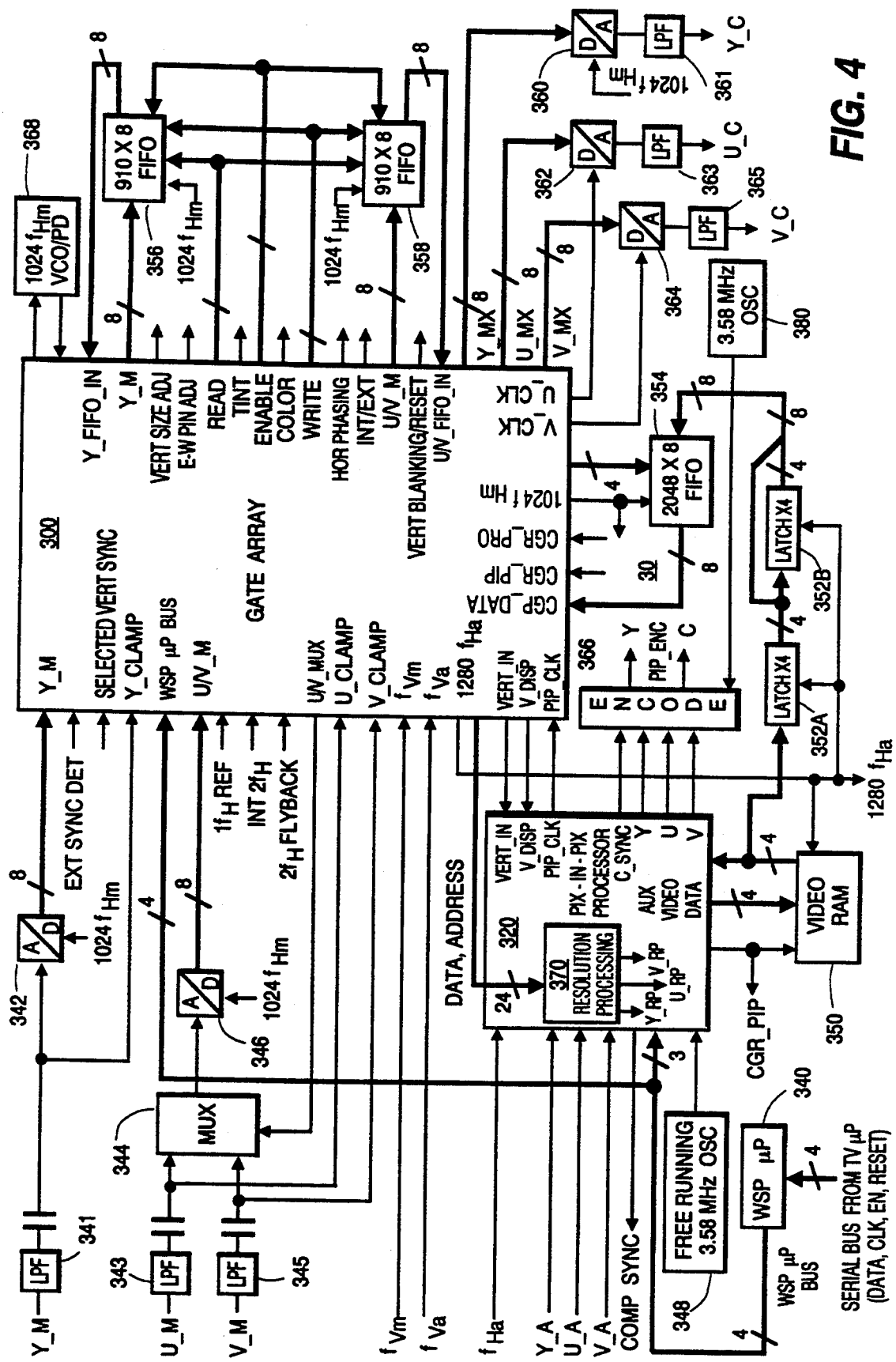
FIG. 4 is a block diagram showing further details of the wide screen processor shown in FIG. 3.

The wide screen processor 30 is shown in more detail in FIG. 3. The principal components of the wide screen processor are a gate array 300, a picture-in-picture circuit 301, analog to digital and digital to analog converters, the second tuner 208, a wide screen processor microprocessor 340 and a wide screen output encoder 227. Further details of the wide screen processor, which are in common with both the 1 $f_H$ and the 2 $f_H$ chassis, for example the PIP circuit, are shown in FIG. 4. A picture-in-picture processor 320, which forms a significant part of the PIP circuit 301, is shown in more detail in FIG. 5. The gate array 300 is shown in more detail in FIG. 6. A number of the components shown in FIG. 3, forming parts of the main and auxiliary signal paths, have already been described in detail.

The second tuner 208 has associated therewith an IF stage 224 and an audio stage 226. The second tuner 208 also operates in conjunction with the WSP $\mu$P 340. The WSP $\mu$P 340 comprises an input output I/O section 340A and an analog output section 340B. The I/O section 340A provides tint and color control signals, the INT/EXT signal for selecting the external RGB video source and control signals for the switches SW1 through SW6. The I/O section also monitors the EXT SYNC DET signal from the RGB interface to protect the deflection circuit and cathode ray tube(s). The analog output section 340B provides control signals for vertical size, east-west adjust and horizontal phase, through respective interface circuits 254, 256 and 258.

The gate array 300 is responsible for combining video information from the main and auxiliary signal paths to implement a composite wide screen display, for example one of those shown in the different parts of FIG. 1. Clock information for the gate array is provided by phase locked loop 374, which operates in conjunction with low pass filter 376. The main video signal is supplied to the wide screen processor in analog form, and Y U V format, as signals designated Y—M, U—M and V—M. These main signals are converted from analog to digital form by analog to digital converters 342 and 346, shown in more detail in FIG. 4.

The color component signals are referred to by the generic designations U and V, which may be assigned to either R-Y or B-Y signals, or I and Q signals. The sampled luminance bandwidth is limited to 8 MHz because the system clock rate is 1024 $f_H$, which is approximately 16 MHz. A single analog to digital converter and an analog switch can be used to sample the color component data because the U and V signals are limited to 500 KHz, or 1.5 MHz for wide I. The select line UV_MUX for the analog switch, or multiplexer 344, is an 8 MHz signal derived by dividing the system clock by 2. A one clock wide start of line SOL pulse synchronously resets this signal to zero at the beginning of each horizontal video line. The UV_MUX line than toggles in state each clock cycle through the horizontal line. Since the line length is an even number of clock cycles, the state of the UV_MUX, once initialized, will consistently toggle 0, 1, 0, 1, . . . , without interruption. The Y and UV data streams out of the analog to digital converters 342 and 346 are shifted because the analog to digital converters each have 1 clock cycle of delay. In order to accommodate for this data shift, the clock gating information from the interpolator control 349 of main signal processing path 304 must be similarly delayed. Were the clock gating information not delayed, the UV data will not be correctly paired when deleted. This is important because each UV pair represents one vector. A U element from one vector cannot be paired with a V element from another vector without causing a color shift. Instead, a V sample from a previous pair will be deleted along with the current U sample. This method of UV multiplexing is referred to as 2:1:1, as there are two luminance samples for every pair of color component (U, V) samples. The Nyquist frequency for both U and V is effectively reduced to one half of the luminance Nyquist frequency. Accordingly, the Nyquist frequency of the output of the analog to digital converter for the luminance component is 8 MHz, whereas the Nyquist frequency of the output of the analog to digital converter for the color components is 4 MHz.

The PIP circuit and/or the gate array may also include means for enhancing the resolution of the auxiliary data notwithstanding the data compression. A number of data reduction and data restoration schemes have been developed, including for example paired pixel compression and dithering and dedithering. Moreover, different dithering sequences involving different numbers of bits and different paired pixel compressions involving different numbers of bits are contemplated. One of a number of particular data reduction and restoration schemes can be selected by the WSP μP 340 in order to maximize resolution of the displayed video for each particular kind of picture display format. These schemes are explained in detail in connection with FIGS. 15–20.

The gate array includes interpolators which operate in conjunction with line memories, which may be implemented as FIFO's 356 and 358. The interpolator and FIFO's are utilized to resample the main signal as desired. An additional interpolator can resample the auxiliary signal. Clock and synchronizing circuits in the gate array control the data manipulation of both the main and auxiliary signals, including the combination thereof into a single output video signal having Y_MX, U_MX and V_MX components. These output components are converted to analog form by digital to analog converters 360, 362 and 364. The analog form signals, designated Y, U and V, are supplied to the 1 $f_H$ to 2 $f_H$ converter 40 for conversion to noninterlaced scanning. The Y, U and V signals are also encoded to Y/C format by encoder 227 to define a wide format ratio output signal Y_OUT_EXT/C_OUT_EXT available at panel jacks. Switch SWS selects a synchronizing signal for the encoder 227 from either the gate array, C_SYNC_MN, or from the PIP circuit, C_SYNC_AUX. Switch SW6 selects between Y_M and C_SYNC_AUX as synchronizing signal for the wide screen panel output.

Figure 12:
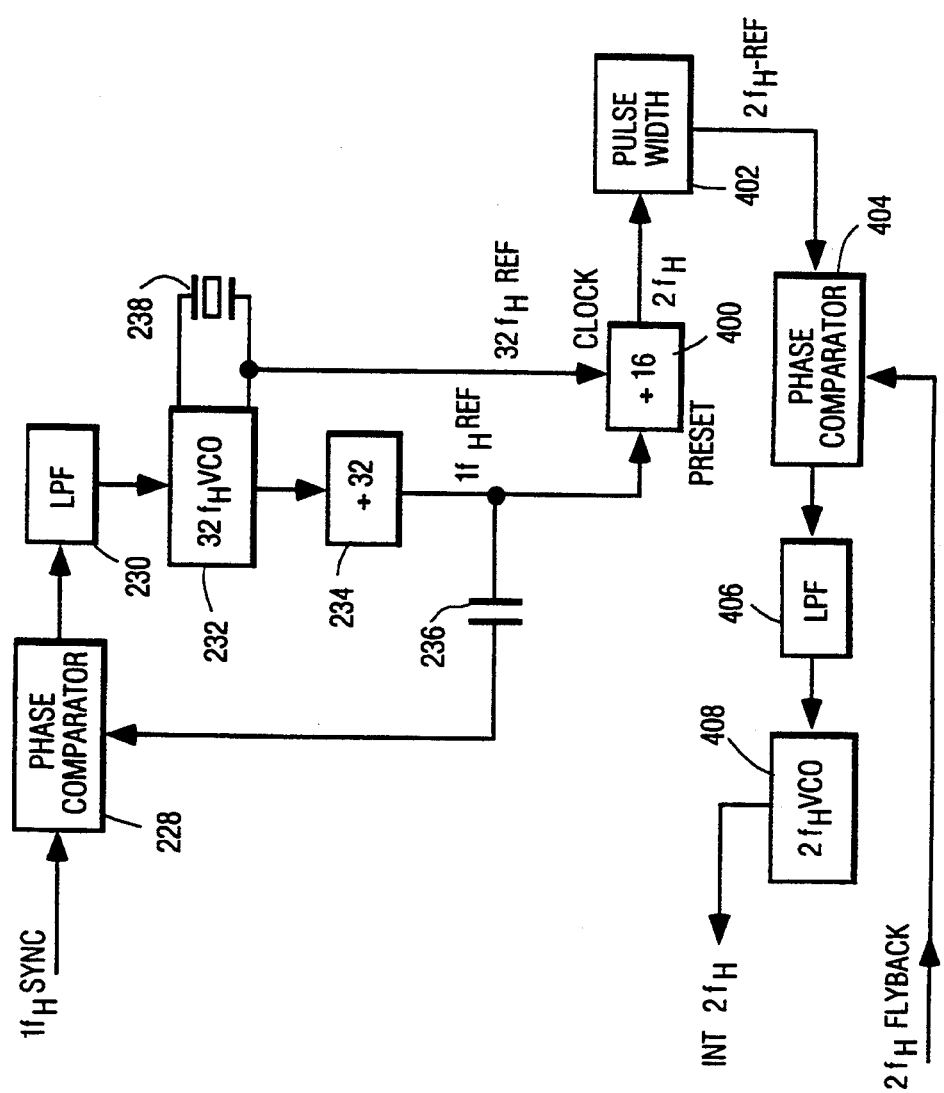
FIG. 12 is a block diagram of a circuit for generating the internal 2 $f_H$ signal in the 1 $f_H$ to 2 $f_H$ conversion.

Portions of the horizontal synchronizing circuit are shown in more detail in FIG. 12. Phase comparator 228 is part of a phase locked loop including low pass filter 230, voltage controlled oscillator 232, divider 234 and capacitor 236. The voltage controlled oscillator 232 operates at 32 $f_H$, responsive to a ceramic resonator or the like 238. The output of the voltage controlled oscillator is divided by 32 to provide a proper frequency second input signal to phase comparator 228. The output of the divider 234 is a 1 $f_H$ REF timing signal. The 32 $f_H$ REF and 1 $f_H$ REF timing signals are supplied to a divide by 16 counter 400. A 2 $f_H$ output is supplied to a pulse width circuit 402. Presetting divider 400 by the 1 $f_H$ REF signal assures that the divider operates synchronously with the phase locked loop of the video signals input section. Pulse width circuit 402 assures that a 2 $f_H$-REF signal will have an adequate pulse width to assure proper operation of the phase comparator 404, for example a type CA1391, which forms part of a second phase locked loop including low pass filter 406 and 2 $f_H$ voltage controlled oscillator 408. Voltage controlled oscillator 408 generates an internal 2 $f_H$ timing signal, which is used for driving the progressively scanned display. The other input signal to phase comparator 404 is the 2 $f_H$ flyback pulses or a timing signal related thereto. The use of the second phase locked loop including phase comparator 404 is useful for assuring that each 2 $f_H$ scanning period is symmetric within each 1 $f_H$ period of the input signal. Otherwise, the display may exhibit a raster split, for example, wherein half of the video lines are shifted to the right and half of the video lines are shifted to the left.

The deflection circuit 50 is shown in more detail in FIG. 13 A circuit 500 is provided for adjusting the vertical size of the raster, in accordance with a desired amount of vertical overscan necessary for implementing different display formats. As illustrated diagrammatically, a constant current source 502 provides a constant quantity of current $I_{RAMP}$ which charges a vertical ramp capacitor 504. A transistor 506 is coupled in parallel with the vertical ramp capacitor, and periodically discharges the capacitor responsive to the vertical reset signal. In the absence of any adjustment, current $I_{RAMP}$ provides the maximum available vertical size for the raster. This might correspond to the extent of vertical overscan needed to fill the wide screen display by an expanded 4×3 format display ratio signal source, as shown in FIG. 1(a). To the extent that less vertical raster size is required, an adjustable current source 508 diverts a variable amount of current $I_{ADJ}$ from $I_{RAMP}$, so that vertical ramp capacitor 504 charges more slowly and to a smaller peak value. Variable current source 508 is responsive to a vertical size adjust signal, for example in analog form, generated by a vertical size control circuit. Vertical size adjustment 500 is independent of a manual vertical size adjustment 510, which may be implemented by a potentiometer or back panel adjustment knob. In either event, the vertical deflection coil(s) 512 receive(s) driving current of the proper magnitude. Horizontal deflection is provided by phase adjusting circuit 518, East-West pin correction circuit 514, a 2 $f_H$ phase locked loop 520 and horizontal output circuit 516.

The RGB interface circuit 60 is shown in more detailed in FIG. 14. The signal which is to be ultimately displayed will be selected between the output of the 1 $f_H$ to 2 $f_H$ converter 40 and an external RGB input. For purposes of the wide screen television described herein, the external RGB input presumed to be a wide format display ratio, progressively scanned source. The external RGB signals and a composite blanking signal from the video signals input section 20 are inputs to an RGB to Y U V converter 610. The external 2 $f_H$ composite synchronizing signal for the external RGB signal is an input to external syncrhonizing signal separator 600. Selection of the vertical synchronizing signal is implemented by switch 608. Selection of the horizontal synchronizing signal is implemented by switch 604. Selection of the video signal is implemented by switch 606. Each of the switches 604, 606 and 608 is responsive to an internal/external control signal generated by the WSP μP 340. Selection of internal or external video sources is a user selection. However, if a user inadvertently selects an external RGB source, when no such source is connected or turned on, or if the external source drops out, the vertical raster will collapse, and serious damage to the cathode ray tube(s) can result. Accordingly, an external synchronizing detector 602 checks for the presence of an external synchronizing signal. In the absence of such a signal, a switch override control signal is transmitted to each of switches 604, 606 and 608, to prevent selection of the external RGB source if the signal therefrom is not present. The RGB to YUV converter 610 also receives tint and color control signals from the WSP μP 340.

A wide screen television in accordance with the inventive arrangements can be implemented with 1 $f_H$ horizontal scanning instead of 2 $f_H$ horizontal scanning, although such a circuit is not illustrated. A 1 $f_H$ circuit would not require the 1 $f_H$ to 2 $f_H$ converter and the RGB interface. Accordingly, there would be no provision for displaying an external wide format display ratio RGB signal at a 2 $f_H$ scanning rate. The wide screen processor and picture-in-picture processor for a 1 $f_H$ circuit would be very similar. The gate array could be substantially identical, although not all of the inputs and outputs would be utilized. The various resolution enhancement schemes described herein can be generally applied without regard to whether the television operates with 1 $f_H$ or 2 $f_H$ scanning.

FIG. 4 is a block diagram showing further details of the wide screen processor 30 shown in FIG. 3 which would be the same for both a 1 $f_H$ and 2 $f_H$ chassis. The Y_A, U_A and V_A signals are an input to the picture in picture processor 320, which can include a resolution processing circuit 370. The wide screen television according to aspects of this invention can expand and compress video. The special effects embodied by the various composite display formats illustrated in part in FIG. 1 are generated by the picture-in-picture processor 320, which can receive resolution processed data signals Y_RP, U_RP and V_RP from resolution processing circuit 370. Resolution processing need not be utilized at all times, but during selected display formats.

Figure 5:
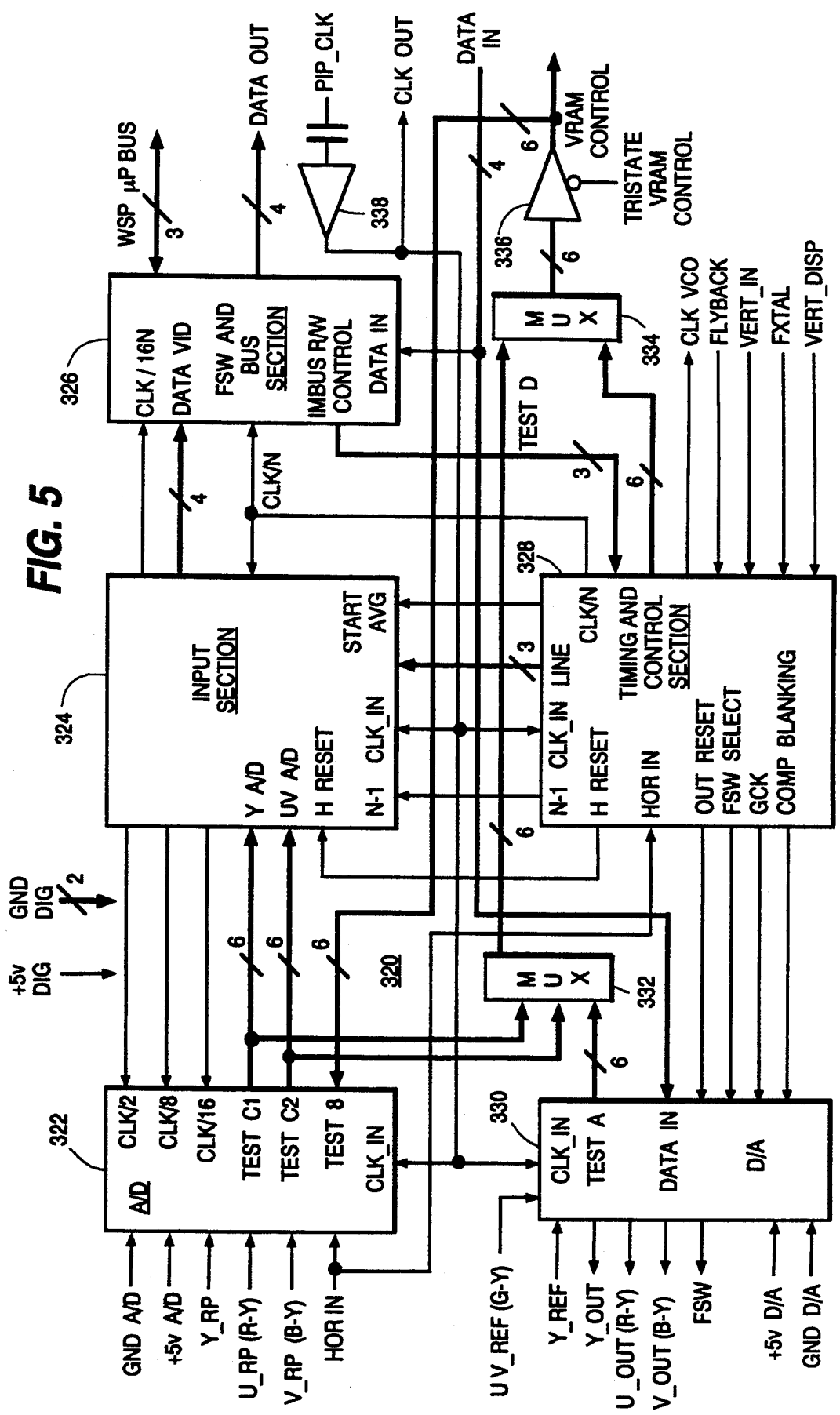
FIG. 5 is a block diagram of the picture-in-picture processor shown in FIG. 4.

The picture-in-picture processor 320 is shown in more detail in FIG. 5. The principal components of the picture-in-picture processor are an analog-to-digital converter section 322, an input section 324, a fast switch (FSW) and bus section 326, a timing and control section 328 and a digital-to-analog converter section 330. The timing and control section 328 is shown in more detail in FIG. 11.

The picture-in-picture processor 320 may be embodied as an improved variation of a basic CPIP chip developed by Thomson Consumer Electronics, Inc. The basic CPIP chip is described more fully in a publication entitled The CTC 140 Picture in Picture (CPIP) Technical Training Manual, available from Thomson Consumer Electronics, Inc., Indianapolis, Ind. A number of special features or special effects are possible, the following being illustrative. The basic special effect is a large picture having a small picture overlaying a portion thereof as shown in FIG. 1(c). The large and small pictures can result from the same video signal, from different video signals and can be interchanged or swapped. Generally speaking, the audio signal is switched to always correspond to the big picture. The small picture can be moved to any position on the screen or can step through a number of predetermined positions. A zoom feature increases and decreases the size of the small picture, for example to any one of a number of preset sizes. At some point, for example the display format shown in FIG. 1(d), the large and small pictures are in fact the same size.

In a single picture mode, for example that shown in FIGS. 1(b), 1(e) or 1(f) a user can zoom in on the content of the single picture, for example, in steps from a ratio of 1.0:1 to 5.0:1. While in the zoom mode a user may search or pan through the picture content enabling the screen image to move across different areas of the picture. In either event, either the small picture or the large picture or the zoomed picture can be displayed in freeze frame (still picture format). This function enables a strobe format, wherein the last nine frames of video can be repeated on the screen. The frame repetition rate can be changed from thirty frames per second to zero frames per second.

The picture-in-picture processor used in the wide screen television according to another inventive arrangement differs from the present configuration of the basic CPIP chip described above. If the basic CPIP chip were used with a television having 16×9 screen, and without a video speed up circuit, the inset pictures would exhibit aspect ratio distortion, due to the effective 4/3 times horizontal expansion resulting from scanning across the wider 16×9 screen. Objects in the picture would be horizontally elongated. If an external speed up circuit were utilized, there would be no aspect ratio distortion, but the picture would not fill the entire screen.

Existing picture-in-picture processors based on the basic CPIP chip as used in conventional televisions are operated in a particular fashion having certain undesirable consequences. The incoming video is sampled with a 640 $f_H$ clock which is locked to the horizontal synchronizing signal of the main video source. In other words, data stored in the video RAM associated with the CPIP chip is not orthogonally sampled with respect to the incoming auxiliary video source. This is a fundamental limitation on the basic CPIP method of field synchronization. The nonorthogonal nature of the input sampling rate results in skew errors of the sampled data.

The limitation is a result of the video RAM used with the CPIP chip, which must use the same clock for writing and reading data. When data from the video RAM, such as video RAM 350, is displayed, the skew errors are seen as random jitter along vertical edges of the picture and are generally considered quite objectionable.

The picture-in-picture processor 320, according to an inventive arrangement and unlike the basic CPIP chip, is adapted for asymmetrically compressing the video data in one of a plurality of selectable display modes. In this mode of operation, the pictures are compressed 4:1 in the horizontal direction and 3:1 in the vertical direction. This asymmetric mode of compression produces aspect ratio distorted pictures for storage in the video RAM. Objects in the pictures are squeezed horizontally. However, if these pictures are read out normally, as for example in the channel scan mode, for display of a 16×9 format display ratio screen, the pictures appear correct. The picture fills the screen and there is no aspect ratio distortion. The asymmetric compression mode according to this aspect of the invention makes it possible to generate the special display formats on a 16×9 screen without external speed up circuitry.

Figure 11:
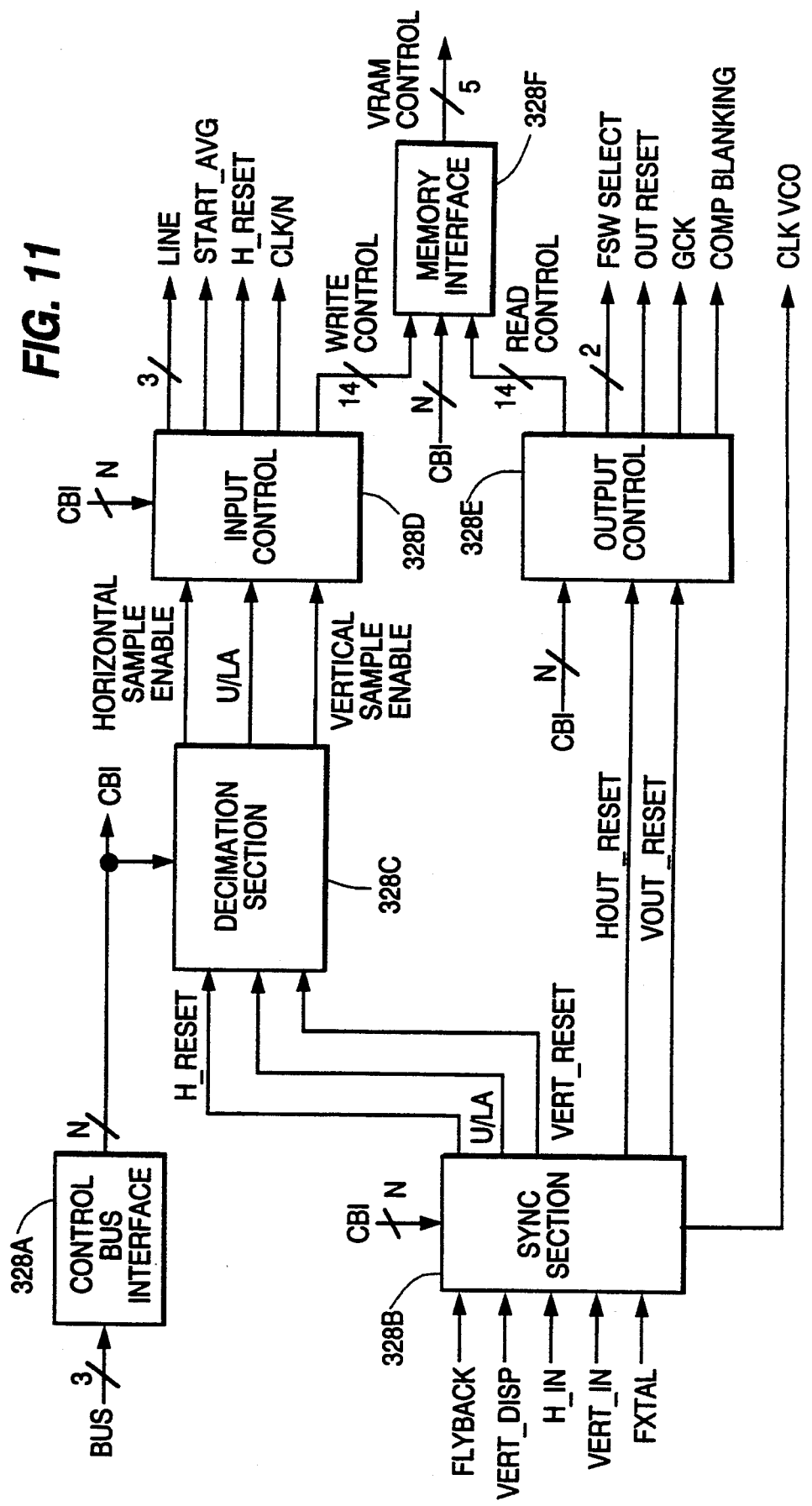
FIG. 11 is a block diagram of the the timing and control section of the picture-in-picture processor of FIG. 5.

FIG. 11 is a block diagram of the timing and control section 328 of the picture-in-picture processor, for example a modified version of the CPIP chip described above, which includes a decimation circuit 328C for implementing the asymmetric compression as one of a plurality of selectable display modes. The remaining display modes can provide auxiliary pictures of different sizes. Each of horizontal and vertical decimation circuits comprises a counter which is programmed for a compression factor from a table of values under the control of the WSP $\mu$P 340. The range of values can be 1:1, 2:1, 3:1 and so on. The compression factors can be symmetric or asymmetric, depending upon how the table is set up. Control of the compression ratios can also be implemented by fully programmable, general purpose decimation circuits under the control of the WSP $\mu$P 340.

In full screen PIP modes, the picture-in-picture processor, in conjunction with a free running oscillator 348 will take Y/C input from a decoder, for example an adaptive line comb filter, decode the signal into Y, U, V color components and generate horizontal and vertical sync pulses. These signals are processed in the picture-in-picture processor for the various full screen modes such as zoom, freeze and channel scan. During the channel scan mode, for example, the horizontal and vertical sync present from the video signals input section will have many discontinuities because the signals sampled (different channels) will have non-related sync pulses and will be switched at seemingly random moments in time. Therefore the sample clock (and read/write video RAM clock) is determined by the free running oscillator. For freeze and zoom modes, the sample clock will be locked to incoming video horizontal sync, which in these special cases is the same as the display clock frequency.

Referring again to FIG. 4, Y, U, V and C_SYNC (composite sync) outputs from the picture-in-picture processor in analog form can be re-encoded into Y/C components by encode circuit 366, which operates in conjunction with a 3.58 MHz oscillator 380. This Y/-C_PIP_ENC signal may be connected to a Y/C switch, not shown, which enables the re-encoded Y/C components to be substituted for the Y/C components of the main signal. From this point on, the PIP encoded Y, U, V and sync signals would be the basis for horizontal and vertical timing in the rest of the chassis. This mode of operation is appropriate for implementing a zoom mode for the PIP, based upon operation of the interpolator and FIFO's in the main signal path.

In a multichannel mode, for example that shown in FIG. 1(*i*), twelve channels of a predetermined scan list can be displayed in twelve small pictures simultaneously. The picture-in-picture processor has an internal clock responsive to a 3.58 MHz oscillator 348. The incoming auxiliary signal is converted from analog to digital form, and responsive to the chosen special effect, is loaded into a video RAM 350. In the embodiments in the Technical Training Manual described above, the compiled special effect is converted back to analog form in the picture-in-picture processor prior to combination with main signal video data. However, in the wide screen televisions described herein, and due in part to limitations on the number of different clock frequencies which are feasible, the auxiliary data is a direct output from the video RAM 350, without further processing by the picture-in-picture processor 320. Minimizing the number of clock signals advantageously reduces radio frequency interference in the circuitry of the televisions.

With further reference to FIG. 5, the picture-in-picture processor 320 comprises analog to digital converting section 322, input section 324, fast switch FSW and bus control section 326, timing and control section 328 and digital to analog converting section 330. In general, the picture-in-picture processor 320 digitizes the video signal into luminance (Y) and color difference signals (U, V), subsampling and storing the results in a 1 megabit video RAM 350 as explained above. The video RAM 350 associated with the picture-in-picture processor 320 has a memory capacity of 1 megabit, which is not large enough to store a full field of video data with 8-bit samples. Increased memory capacity tends to be expensive and can require more complex management circuitry. The smaller number of bits per sample in the auxiliary channel represents a reduction in quantization resolution, or bandwidth, relative to the main signal, which is processed with 8-bit samples throughout. This effective reduction of bandwidth is not usually a problem when the auxiliary displayed picture is relatively small, but can be troublesome if the auxiliary displayed picture is larger, for example the same size as the main displayed picture. Resolution processing circuit 370 can selectively implement one or more schemes for enhancing the quantization resolution or effective bandwidth of the auxiliary video data. A number of data reduction and data restoration schemes have been developed, including for example, paired pixel compression and dithering and dedithering. A dedithering circuit would be operatively disposed downstream of the video RAM 350, for example in the auxiliary signal path of the gate array, as explained in more detail below. Moreover, different dithering and dedithering sequences involving different numbers of bits and different paired pixel compressions involving different number of bits are contemplated. One of a number of particular data reduction and restoration schemes can be selected by the WSP $\mu$P in order to maximize resolution of the displayed video for each particular kind of picture display format.

The luminance and color difference signals are stored in an 8:1:1 six-bit Y, U, V fashion. In other words, each component is quantized into six-bit samples. There are eight luminance samples for every pair of color difference samples. The picture-in-picture processor 320 is operated in a mode whereby incoming video data is sampled with a 640 $f_H$ clock rate locked to the incoming auxiliary vide synchronizing signal instead. In this mode, data stored in the video RAM is orthogonally sampled. When the data is read out of the picture-in-picture processor video RAM 350, it is read using the same 640 $f_H$ clock locked to the incoming auxiliary video signal. However, even though this data was orthogonally sampled and stored, and can be read out orthogonally, it cannot be displayed orthogonally directly from the video RAM 350, due to the asynchronous nature of the main and auxiliary video sources. The main and auxiliary video sources might be expected to be synchronous only in that instance where they are displaying signals from the same video source.

Further processing is required in order to synchronize the auxiliary channel, that is the output of data from the video RAM 350, to the main channel. With reference again to FIG. 4, two four bit latches 352A and 352B are used to recombine the 8-bit data blocks from the video RAM 4-bit output port. The four bit latches also reduce the data clock rate from 1280 $f_H$ to 640 $f_H$.

Generally, the video display and deflection system is synchronized with the main video signal. The main video signal must be speeded up, as explained above, to fill the wide screen display. The auxiliary video signal must be vertically synchronized with the first video signal and the video display. The auxiliary video signal can be delayed by a fraction of a field period in a field memory, and then expanded in a line memory. Synchronization of the auxiliary video data with main video data is accomplished by utilizing the video RAM 350 as a field memory and a first in first out (FIFO) line memory device 354 for expanding the signal. The size of FIFO 354 is 2048×8. The size of FIFO is related to the minimum line storage capacity thought to be reasonably necessary to avoid read/write pointer collisions. Read/write pointer collisions occur when old data is read out of the FIFO before new data has an opportunity to be written into the FIFO. Read/write pointer collisions also occur when new data overwrites the memory before the old data has an opportunity to be read out of the FIFO.

The 8-bit DATA_PIP data blocks from video RAM 350 are written into 2048×8 FIFO 354 with the same picture-in-picture processor 640 $f_H$ clock which was used to sample the video data, that is, the 640 $f_H$ clock which is locked to the auxiliary signal, rather than the main signal. The FIFO 354 is read using the display clock of 1024 $f_H$, which is locked to horizontal synchronizing component of the main video channel. The use of a multiple line memory (FIFO) which has independent read and write port clocks enables data which was orthogonally sampled at a first rate to be displayed orthogonally at a second rate. The asynchronous nature of the read and write clocks, however, does require that steps be undertaken to avoid read/write pointer collisions.

The gate array 300 is common to both wide screen processors 30 and 31. The main signal path 304, auxiliary signal path 306 and output signal path 312 are shown in block diagram form in FIG. 6. The gate array also comprises a clocks/sync circuit 320 and a WSP μP decoder 310. Data and address output lines of the WSP μP decoder 310, identified as WSP DATA, are supplied to each of the main circuits and paths identified above, as well as to the picture-in-picture processor 320 and resolution processing circuit 370. It will be appreciated that whether or not certain circuits are, or are not, defined as being part of the gate array is largely a matter of convenience for facilitating explanation of the inventive arrangements.

The gate array is responsible for expanding, compressing and cropping video data of the main video channel, as and if necessary, to implement different picture display formats. The luminance component Y_MN is stored in a first in first out (FIFO) line memory 356 for a length of time depending on the nature of the interpolation of the luminance component. The combined chrominance components U/V_MN are stored in FIFO 358. Auxiliary signal luminance and chrominance components Y_PIP, U_PIP and V_PIP are developed by demultiplexer 355. The luminance component undergoes resolution processing, as desired, in circuit 357, and is expanded as necessary by interpolator 359, generating signal Y_AUX as an output.

In some instances, the auxiliary display will be as large as the main signal display, as shown for example in FIG. 1(d). The memory limitations associated with the picture-in-picture processor and video RAM 350 can provide an insufficient number of data points, or pixels for filling such a large display area. In those circumstances, resolution processing circuit 357 can be used to restore pixels to the auxiliary video signal to replace those lost during data compression, or reduction. The resolution processing may correspond to the resolution processing undertaken by circuit 370 shown in FIG. 4. As an example, circuit 370 may be a dithering circuit and circuit 357 may be a dedithering circuit.

Figure 10:
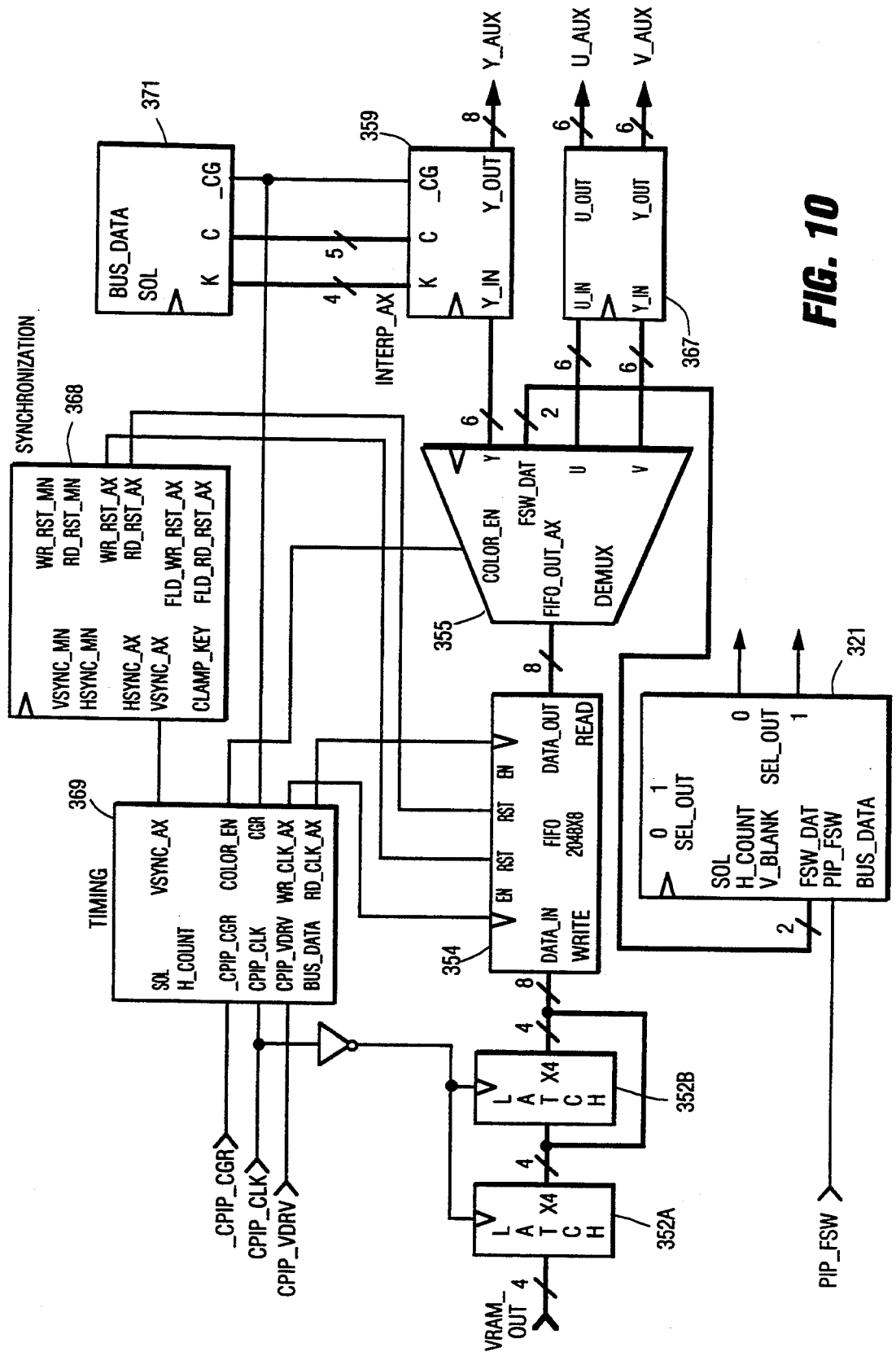
FIG. 10 is a block diagram showing the auxiliary signal path of FIG. 6 in more detail.

The auxiliary video input data is sampled at a 640 $f_H$ rate and stored in video RAM 350. The auxiliary data is read out of video RAM 350 is designated VRAM_OUT. The PIP circuit 301 also has the capability of reducing the auxiliary picture by equal integer factors horizontally and vertically, as well as asymmetrically. With further reference to FIG. 10, the auxiliary channel data is buffered and synchronized to the main channel digital video by the 4 bit latches 352A and 352B, the auxiliary FIFO 354, timing circuit 369 and synchronization circuit 368. The VRAM_OUT data is sorted into Y (luminance), U, V (color components), and FSW_DAT (fast switch data) by demultiplexer 355. The FSW_DAT indicates which field type was written into the video RAM. The PIP_FSW signal is received directly from the PIP circuit and applied to the output control circuit 321 to determine which field read out of video RAM is to be displayed during the small picture modes.

The auxiliary channel is sampled at 640 $f_H$ rate while the main channel is sampled at a 1024 $f_H$ rate. The auxiliary channel FIFO 354 converts the data from the auxiliary channel sample rate to the main channel clock rate. In this process, the video signal undergoes an 8/5 (1024/640) compression. This is more than the 4/3 compression necessary to correctly display the auxiliary channel signal. Therefore, the auxiliary channel must be expanded by the interpolator 359 to correctly display a 4×3 small picture. The interpolator 359 is controlled by interpolator control circuit 371, which is itself responsive to WSP μP 340. The amount of interpolator expansion required is 5/6. The expansion factor X is determined as follows:

$$X=(640/1024)*(4/3)=5/6$$

The chrominance components U_PIP and V_PIP are delayed by circuit 367 for a length of time depending on the nature of the interpolation of the luminance component, generating signals U_AUX and V_AUX as outputs. The respective Y, U and V components of the main and auxiliary signals are combined in respective multiplexers 315, 317 and 319 in the output signal path 312, by controlling the read enable signals of the FIFO's 354, 356 and 358. The multiplexers 315, 317 and 319 are responsive to output multiplexer control circuit 321. Output multiplexer control circuit 321 is responsive to the clock signal CLK, the start of line signal SOL, the H_COUNT signal, the vertical blanking reset signal and the output of the fast switch from the picture-in-picture processor and WSP μP 340. The multiplexed luminance and chrominance components Y_MX, U_MX and V_MX are supplied to respective digital-/analog converters 360, 362 and 364 respectively. The digital to analog converters are followed by low pass filters 361, 363 and 365 respectively, shown in FIG. 4. The various functions of the picture-in-picture processor, the gate array and the data reduction circuit are controlled by WSP μP 340. The WSP μP 340 is responsive to the TV μP 216, being connected thereto by a serial bus. The serial bus may be a four wire bus as shown, having lines for data, clock signals, enable signals and reset signals. The WSP μP 340 communicates with the different circuits of the gate array through a WSP μP decoder 310.

In one case, it is necessary to compress the 4×3 NTSC video by a factor of 4/3 to avoid aspect ratio distortion of the displayed picture. In the other case, the video can be expanded to perform horizontal zooming operations usually accompanied by vertical zooming. Horizontal zoom operations up to 33% can be accomplished by reducing compressions to less than 4/3. A sample interpolator is used to recalculate the incoming video to a new pixel positions because the luminance video bandwidth, up to 5.5 MHz for S-VHS format, occupies a large percentage of the Nyquist fold over frequency, which is 8 MHz for a 1024 $f_H$ clock.

Figure 6:
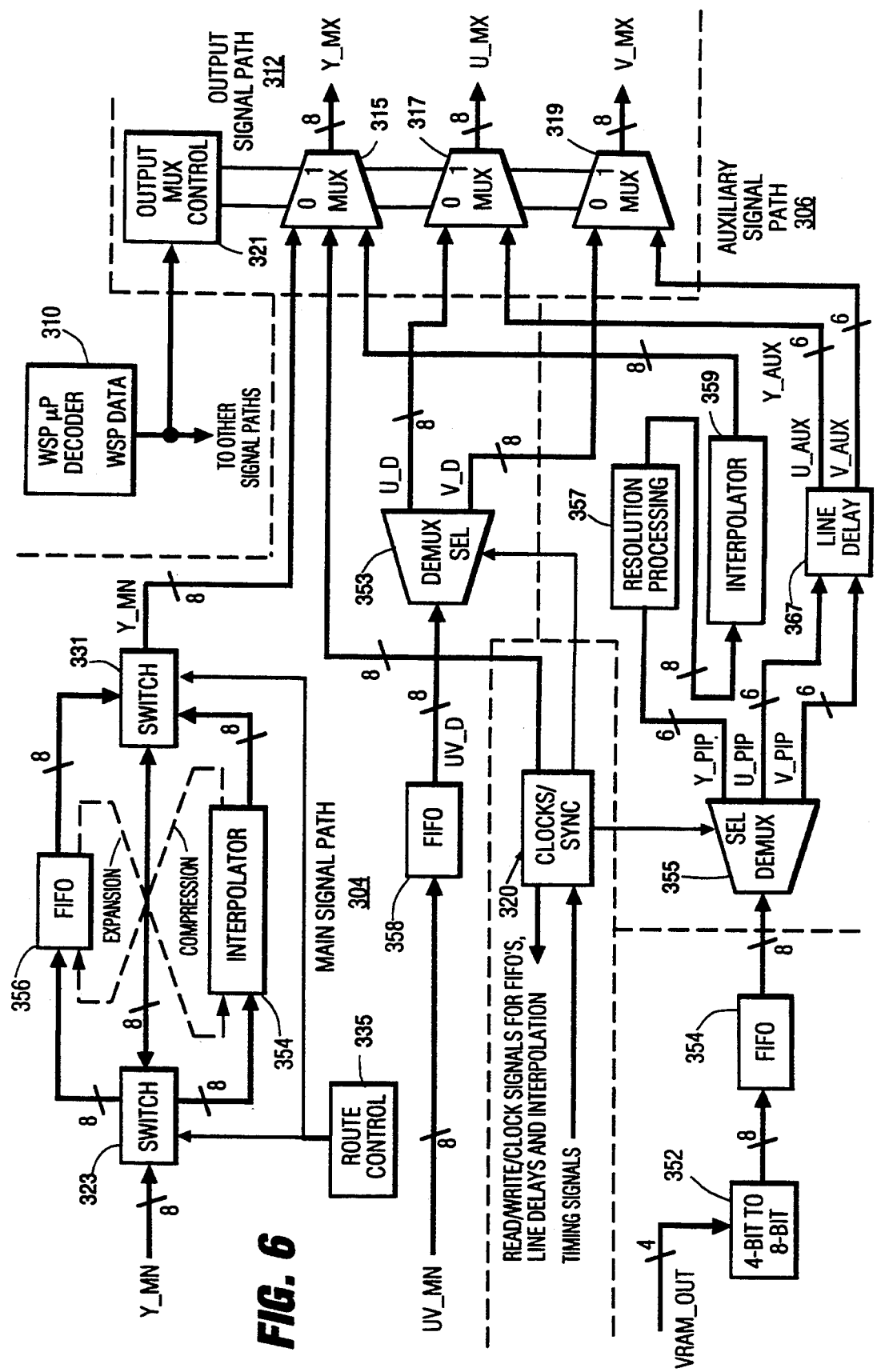
FIG. 6 is a block diagram of the gate array shown in FIG. 4, illustrating the main, auxiliary and output signal paths.

As shown in FIG. 6, the luminance data Y_MN is routed through an interpolator 337 in the main signal path 304 which recalculates sample values based on the compression or the expansion of the video. The function of the switches or route selectors 323 and 331 is to reverse the topology of the main signal path 304 with respect to the relative positions of the FIFO 356 and the interpolator 337. In particular, these switches select whether the interpolator 337 precedes the FIFO 356, as required for compression, or whether the FIFO 356 precedes the interpolator 337, as required for expansion. The switches 323 and 331 are responsive to a route control circuit 335, which is itself responsive to the WSP μP 340. It will be remembered that during small picture modes the auxiliary video signal is compressed for storage in the video RAM 350, and only expansion is necessary for practical purposes. Accordingly, no comparable switching is required in the auxiliary signal path.

Figure 9:
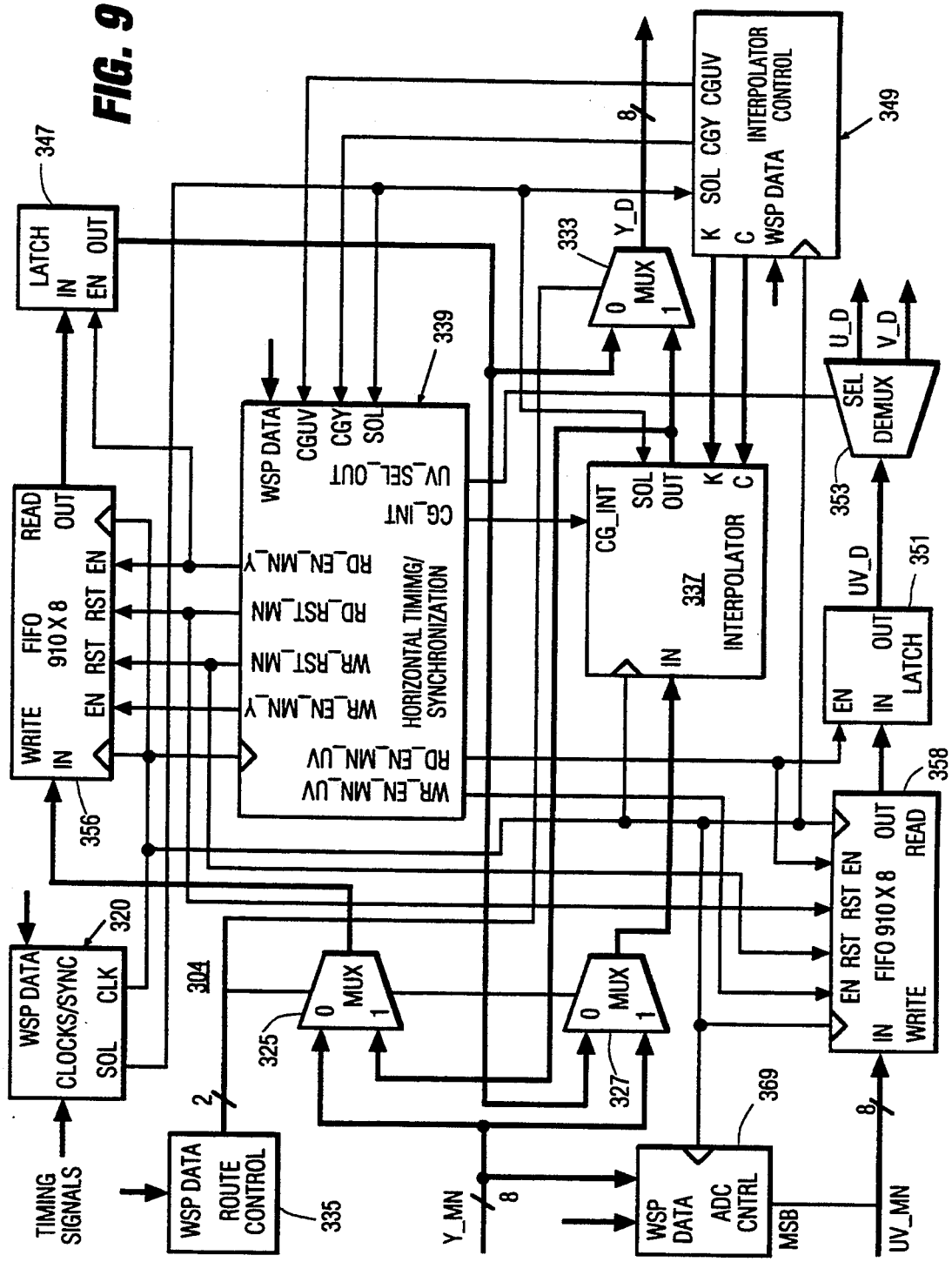
FIG. 9 is a block diagram showing the main signal path of FIG. 6 in more detail.

The main signal path is shown in more detail in FIG. 9. The switch 323 is implemented by two multiplexers 325 and 327. Switch 331 is implemented by multiplexer 333. The three multiplexers are responsive to the route control circuit 335, which is itself responsive to the WSP μP 340. A horizontal timing/synchronization circuit 339 generates timing signals controlling the writing and reading of the FIFOs, as well as latches 347 and 351, and multiplexer 353. The clock signal CLK and start of line signal SOL are generated by the clocks/sync circuit 320. An analog to digital conversion control circuit 369 is responsive to Y_MN. the WSP μP 340 and the most significant bit of UV_MN.

An interpolator control circuit 349 generates intermediate pixel position values (K), interpolator compensation filter weighting (C) and clock gating information CGY for the luminance and CGUV for the color components. It is the clock gating information which pauses (decimates) or repeats the FIFO data to allow samples not to be written on some clocks for effecting compression or some samples to be read multiple times for expansion.

It is possible to perform video compressions and expansions through the use of a FIFO. For example, a WR_EN_MN_Y signal enables data to be written into the FIFO 356. Every fourth sample can be inhibited from being written into the FIFO. This constitutes a 4/3 compression. It is the function of the interpolator 337 to recalculate the luminance samples being written into the FIFO so that the data read out of the FIFO is smooth, rather than jagged. Expansions may be performed in exactly the opposite manner as compressions. In the case of compressions the write enable signal has clock gating information attached to it in the form of inhibit pulses. For expanding data, the clock gating information is applied to the read enable signal. This will pause the data as it is being read from the FIFO 356. In this case it is the function of the interpolator 337, which follows the FIFO 356 during this process, to recalculate the sampled data from jagged to smooth. In the expansion case the data must pause while being read from the FIFO 356 and while being clocked into the interpolator 337. This is different from the compression case where the data is continuously clocked through the interpolator 337. For both cases, compression and expansion, the clock gating operations can easily be performed in a synchronous manner, that is, events can occur based on the rising edges of the system clock 1024 $f_H$.

There are a number of advantages in this topology for luminance interpolation. The clock gating operations, namely data decimation and data repetition, may be performed in a synchronous manner. If a switchable video data topology were not used to interchange the positions of the interpolator and FIFO, the read or write clocks would need to be double clocked to pause or repeat the data. The term double clocked means that two data points must be written into the FIFO in a single clock cycle or read from the FIFO during a single clock cycle. The resulting circuitry cannot be made to operate synchronously with the system clock, since the writing or reading clock frequency must be twice as high as the system clock frequency. Moreover, the switchable topology requires only one interpolator and one FIFO to perform both compressions and expansions. If the video switching arrangement described herein were not used, the double clocking situation can be avoided only by using two FIFO's to accomplish the functionality of both compression and expansion. One FIFO for expansions would need to be placed in front of the interpolator and one FIFO for compressions would need to be placed after the interpolator.

Interpolation of the auxiliary signal takes place in the auxiliary signal path 306. The PIP circuit 301 manipulates a 6 bit Y, U, V, 8:1:1 field memory, video RAM 350, to store incoming video data. The video RAM 350 holds two fields of video data in a plurality of memory locations. Each memory location holds eight bits of data. In each 8-bit location there is one 6-bit Y (luminance) sample (sampled at 640 $f_H$) and 2 other bits. These two other bits hold either fast switch data (FSW_DAT) or part of a U or V sample (sampled at 80 $f_H$). The FSW_DAT values indicate which type of field was written into video RAM. Since there are two fields of data stored in the video RAM 350, and the entire video RAM 350 is read during the display period, both fields are read during the display scan. The PIP circuit 301 will determine which field will be read out of the memory to be displayed through the use of the fast switch data. The PIP circuit always reads the opposite field type that is being written to overcome a motion tear problem. If the field type being read is the opposite type than that being displayed, then the even field stored in the video RAM is inverted by deleting the top line of the field when the field is read out of memory. The result is that the small picture maintains correct interlace without a motion tear.

The clocks/sync circuit 320 generates read, write and enable signals needed for operating FIFOs 354, 356 and 358. The FIFOs for the main and auxiliary channels are enabled for writing data into storage for those portions of each video line which is required for subsequent display. Data is written from one of the main or auxiliary channels, but not both, as necessary to combine data from each source on the same video line or lines of the display. The FIFO 354 of the auxiliary channel is written synchronously with the auxiliary video signal, but is read out of memory synchronously with the main video signal. The main video signal components are read into the FIFOs 356 and 358 synchronously with the main video signal, and are read out of memory synchronously with the main video. How often the read function is switched back and forth between the main and auxiliary channels is a function of the particular special effect chosen.

Figure 7:
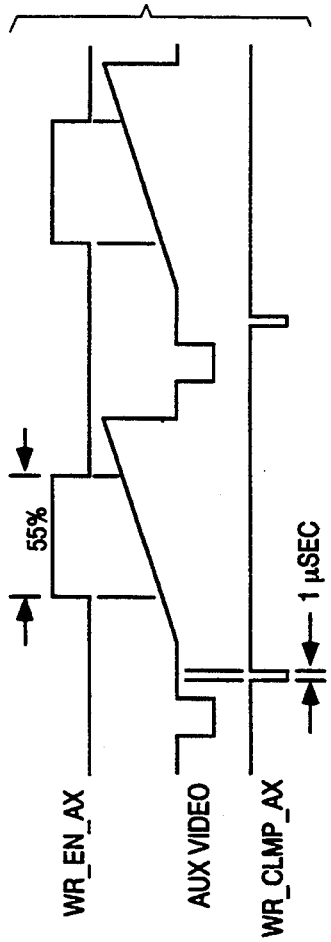
FIGS. 7 and 8 are timing diagrams useful for explaining the generation of the display format shown in FIG. 1(d), using fully cropped signals.
Figure 8:
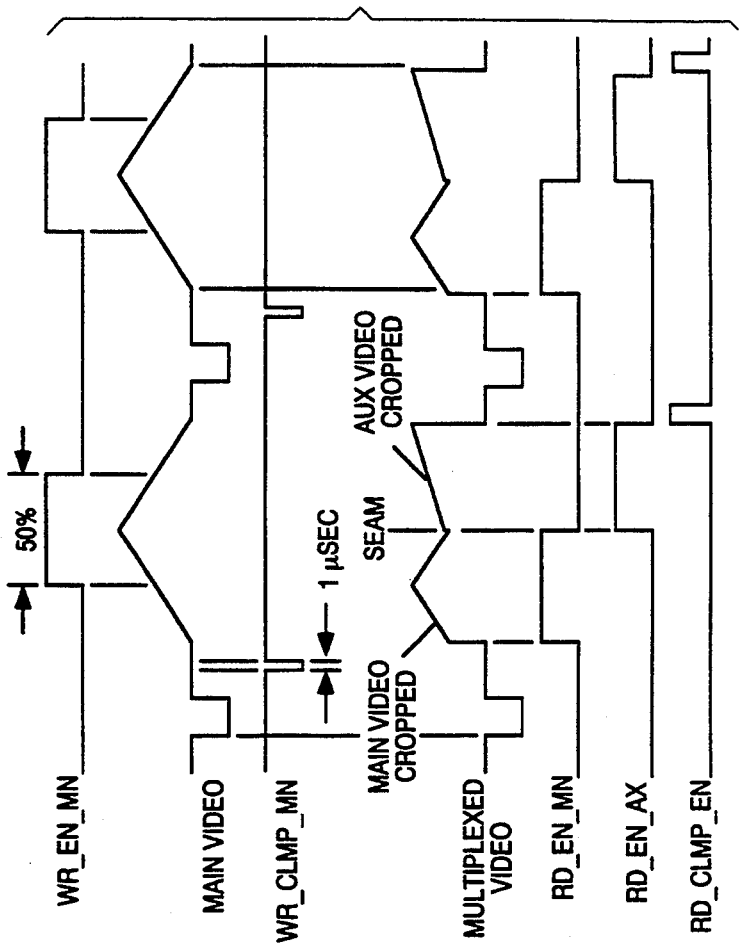

Generation of different special effects such as cropped side-by-side pictures are accomplished through manipulating the read and write enable control signals for the line memory FIFOs. The process for this display format is illustrated in FIGS. 7 and 8. In the case of cropped side-by-side displayed pictures, the write enable control signal (WR_EN_AX) for 2048×8 FIFO 354 of the auxiliary channel is active for (½)*(5/12)=5/12 or approximately 41% of the display active line period (post speed up), or 67% of the auxiliary channel active line period (pre speed up), as shown in FIG. 7. This corresponds to approximately 33% cropping (approximately 67% active picture) and the interpolator expansion of the signal by 5/6. In the main video channel, shown in the upper part of FIG. 8, the write enable control signal (WR_EN_MN_Y) for the 910×8 FIFOs 356 and 358 is active for (½)*(4/3)=0.67 or 67% of the display active line period. This corresponds to approximately 33% cropping and a compression ratio of 4/3 being performed on the main channel video by the 910×8 FIFOs.

In each of the FIFOs, the video data is buffered to be read out at a particular point in time. The active region of time where the data may be read out from each FIFO is determined by the display format chosen. In the example of the side-by-side cropped mode shown, the main channel video is being displayed on the left hand half of the display and the auxiliary channel video is displayed on the right hand half of the display. The arbitrary video portions of the waveforms are different for the main and auxiliary channels as illustrated. The read enable control signal (RD_EN_MN) of the main channel 910×8 FIFOs is active for 50% of the display active line period of the display beginning with the start of active video, immediately following the video back porch. The auxiliary channel read enable control signal (RD_EN_AX) is active for the other 50% of the display active line period beginning with the falling edge of the RD_EN_MN signal and ending with the beginning of the main channel video front porch. It may be noted that write enable control signals are synchronous with their respective FIFO input data (main or auxiliary) while the read enable control signals are synchronous with the main channel video.

The display format shown in FIG. 1(d) is particularly desirable as it enables two nearly full field pictures to displayed in a side by side format. The display is particularly effective and appropriate for a wide format display ratio display, for example 16×9. Most NTSC signals are represented in a 4×3 format. which of course corresponds to 12×9. Two 4×3 format display ratio NTSC pictures may be presented on the same 16×9 format display ratio display, either by cropping the pictures by 33% or squeezing the pictures by 33%, and introducing aspect ratio distortion. Depending on user preference, the ratio of picture cropping to aspect ratio distortion may be set any where in between the limits of 0% and 33%. As an example, two side by side pictures may be presented as 16.7% squeezed and 16.7% cropped.

The operation can be described in terms of general ratios of speedup and cropping. The video display means can be considered to have a display format ratio of width to height of M:N, the first video signal source can be considered to have a display format ratio of A:B and the second video signal source can be considered to have a display format ratio of C:D. The first video signal can be selectively speeded up by a factor in a first range of approximately 1 to (M/N÷A/B) and selectively cropped horizontally by a factor in a second range of approximately 0 to [(M/N÷A/B)−1]. The second video signal can be selectively speeded up by a factor in a third range of approximately 1 to (M/N÷C/D) and selectively cropped horizontally by a factor in a fourth range of approximately 0 to [(M/N÷C/D)−1].

The horizontal display time for a 16×9 format display ratio display is the same as a 4×3 format display ratio display, because both have 62.5 microsecond nominal line length. Accordingly, an NTSC video signal must be sped up by a factor of 4/3 to preserve a correct aspect ratio, without distortion. The 4/3 factor is calculated as ratio of the two display formats:

$$4/3 = (16/9)/(4/3)$$

Variable interpolators are utilized in accordance with aspects of this invention to speed up the video signals. In the past, FIFOs having different clock rates at the inputs and outputs have been used to perform a similar function. By way of comparison, if two NTSC 4×3 format display ratio signals are displayed on a single 4×3 format display ratio display, each picture must be distorted or cropped, or some combination thereof, by 50%. A speed up comparable to that needed for a wide screen application is unnecessary.

Data reduction or compression, and data restoration or expansion, can be accomplished by alternative methods, in accordance with various inventive arrangements. In accordance with one alternative, the auxiliary signal is "dithered" by a resolution processing circuit 370 and "dedithered" by resolution processing circuit 357. Resolution processing circuit 370 may also be thought of as a data reduction circuit and resolution processing circuit 357 may also be thought of as a data restoration circuit. Dithering is a process wherein an n-bit signal has an m-bit dithered sequence added thereto, after which the m least significant bits are truncated. A 1-bit dithering circuit and corresponding 1-bit dedithering circuit are shown in FIGS. 15 and 16 respectively. A 2-bit dithering circuit and corresponding 2-bit dedithering circuit are shown in FIGS. 17 and 18 respectively.

With reference to FIGS. 15 and 16, a summing circuit 372 combines an n-bit signal with a 1-bit dither sequence. An advantageous 1-bit dither sequence is 01010101, etc. After adding the dither sequence to the 1-bit signal, the least significant bit is truncated by circuit 374. The n−1 bit dithered signal is then processed by pix-in-pix module 320, latches 352A and 352B and FIFO 354. The subsequent output of the pip decoding circuit 306B is an n−1 bit dithered signal. In data restoration circuit 357 the n−1 bit dithered signal is supplied to a summing circuit 802 and one input of an AND gate 804. A signal on the other input of AND gate 804 masks the least significant bit of the dithered signal. The output of AND gate 804 is supplied directly to one input of exclusive OR gate 801 and is delayed by one clock, or one pixel, by circuit 806, before being supplied as the other input to exclusive OR gate 808. The output of exclusive OR gate 808 is one input to AND gate 810 and the input to Y interpolator 359, the input forming the new least significant bit of the dedithered signal. The other input of AND gate 810 is a signal having the same dither sequence and the same phase as the dithering signal applied to summing junction 372. The output AND gate 810 is a subtractive input to summing circuit 802. The output of summing circuit 802 is combined with the additional bit supplied by the output of exclusive OR gate 808, providing an n-bit, dedithered signal as an input to Y interpolator 359.

Figure 17:
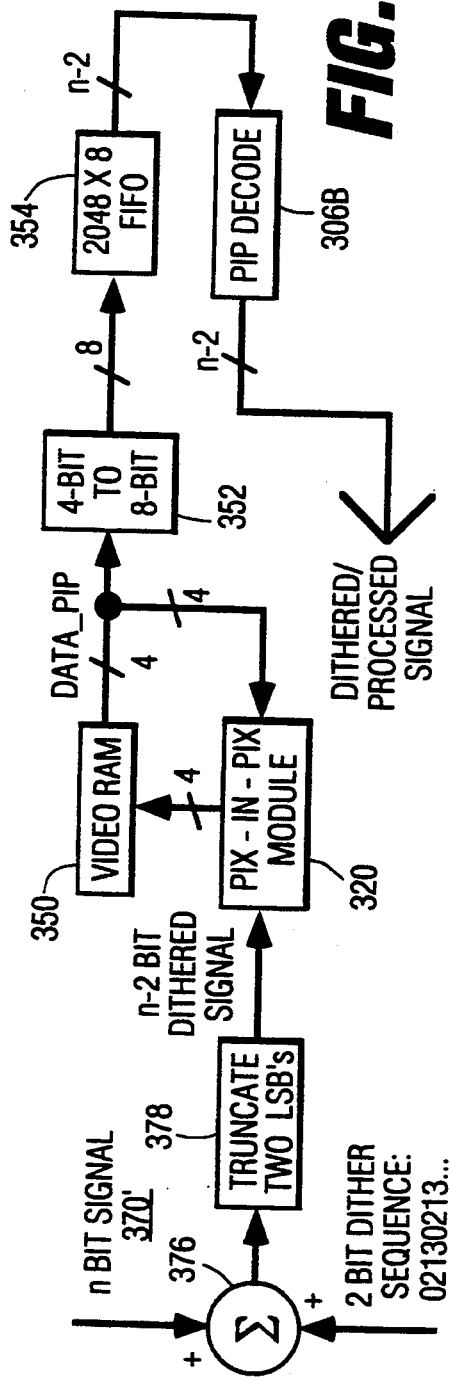
FIGS. 17 and 18 are a block diagrams for 2-bit dithering and dedithering circuits respectively, for implementing the resolution processing circuits of FIG. 4 and FIG. 10.
Figure 18:
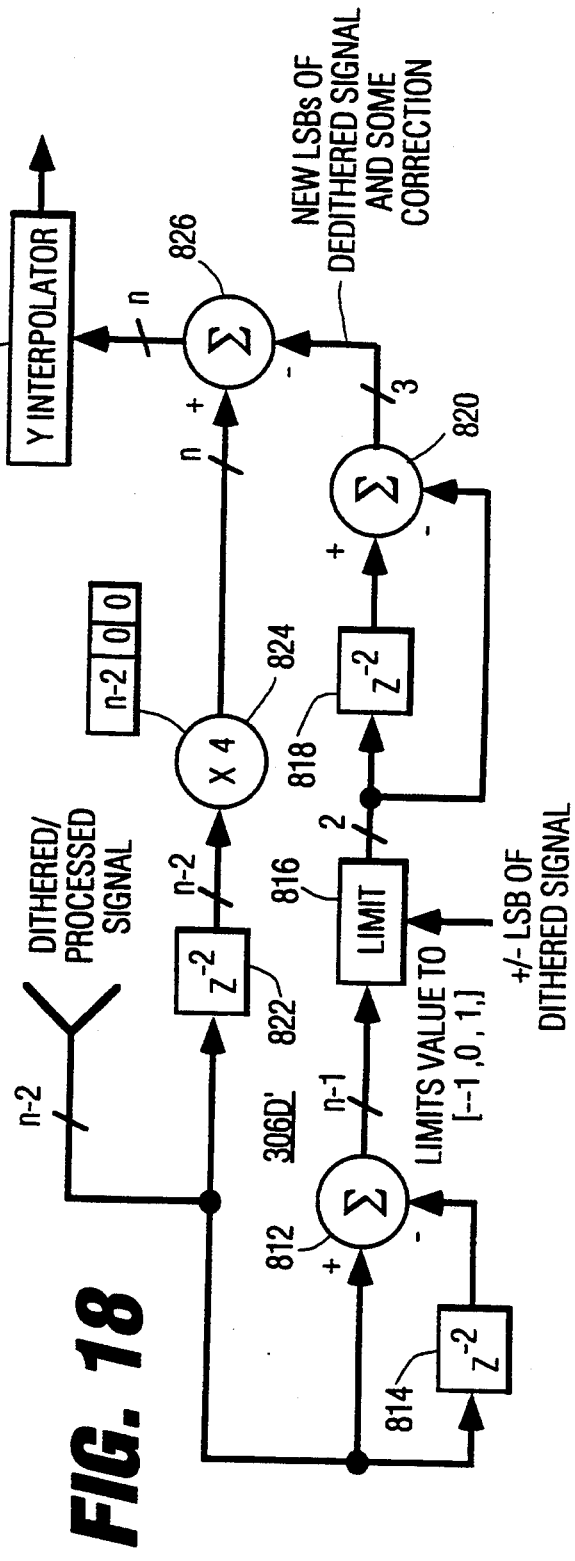

With reference to FIG. 17, a 2-bit dithering circuit 370' comprises a summing circuit 376, which combines and n-bit signal with a 2-bit dither sequence. In accordance with an inventive arrangement, the dither signal can be defined by any repetitive sequence of the numbers 0, 1, 2, 3 in any order within the sequence. This definition includes the following sequences, as listed in Table 1.

TABLE 1

| 0123 | 1023 | 2013 | 3012 |
| 0132 | 1032 | 2031 | 3021 |
| 0213 | 1230 | 2103 | 3120 |
| 0231 | 1203 | 2130 | 3102 |
| 0312 | 1302 | 2301 | 3201 |
| 0321 | 1320 | 2310 | 3210 |

A 2-bit dither sequence which is particularly advantageous is 02130213, etc., which is illustrated in FIG. 17. The n-bit signal which is the output of summing circuit 376 has its two least significant bits truncated by circuit 378. The n−2 bit dithered signal is then processed by pix-in-pix processor 320, latches 352A and 352B, FIFO 354 and pip decoding circuit 306B.

It appears that the quarter-frequency component is usually more objectionable than the half-frequency component, even though the quarter-frequency component has half the amplitude of the half-frequency component. Accordingly, a dedithering scheme can be chosen to suppress only the quarter-frequency component. A first signal path of the dedithering circuit is for delay and amplitude matching. A second signal path includes a combination inverted bandpass filter and limiter. The inverted bandpass filter cancels the frequency at the center of the passband when added to the delay and amplitude matched original signal. The limiter assures that only amplitudes of dither size will be cancelled. This dedithering arrangement has no effect upon the half sample frequency component of the dithered signal. The half-frequency signal component is low enough in amplitude and high enough in frequency to have sufficiently low visibility to avoid causing a problem.

Such a dedithering circuit 306D' is shown in FIG. 18. The n−2 bit signal at the output of pip decoding circuit 306B is supplied as an input to a two clock, or two pixel, delay circuit 822, a two clock, or two pixel, delay circuit 814 and a summing circuit 812. The output of delay circuit 814 is a subtractive input to summing circuit 812, the output of which is an n−1 bit signal. The n−1 bit dithered signal is an input to limit circuit 816. Output values of the limit circuit are in this case confined to [−1, 0, 1,], that is the absolute value of one. The output of limiting circuit 816 is a 2-bit signal, supplied as an input to two clock, or two pixel, delay circuit 818 and a subtractive input to summing circuit 820. Delay circuit 818 and summing circuit 820 form a bandpass filter having a gain of two at the center frequency, which is ¼ of the sample rate. The 2-bit signal is a twos complement signal. The output of summing circuit 820 is a 3-bit signal, which is a subtractive input to summing circuit 826. The n−2 bit output of delay circuit of 822 is an input to multiplier 824. The output of multiplier 824 is an n-bit signal, wherein the two least significant bits are equal to 0. The values for the two least significant bits (and some correction) are supplied by the summation in circuit 826. The output of summing circuit 826 is an n-bit partially dedithered signal, which is an input to Y interpolator 359.

The resolution, or perceived quality, of the dedithered video signal can be improved under some circumstances by skewing the dither sequence. The dither sequence, whether a one or two bit sequence, repeats continuously on a given line but is phase shifted on different lines. Many possible skewing schemes are possible. Two skewing sequences can be particularly advantageous in hiding artifacts in the display due to the dithering process itself. These skewing sequences are shown in FIG. 19. The one and two pixel, field to field skews are those in which all the lines of one field have the same phase and all the lines of the next field are skewed one or two pixels with respect to the first field. The field to field skews on 2-bit dithered signals work best for frozen pictures. Some line structure can be visible during live video, where there are flat areas in motion. The one pixel skew is particularly advantageous for 2-bit dithers if the signal will be dedithered, but the two pixel skew is presently preferred if the signal will not be dedithered. Whether or not the signal should be dedithered depends upon the display format.

Figure 20:
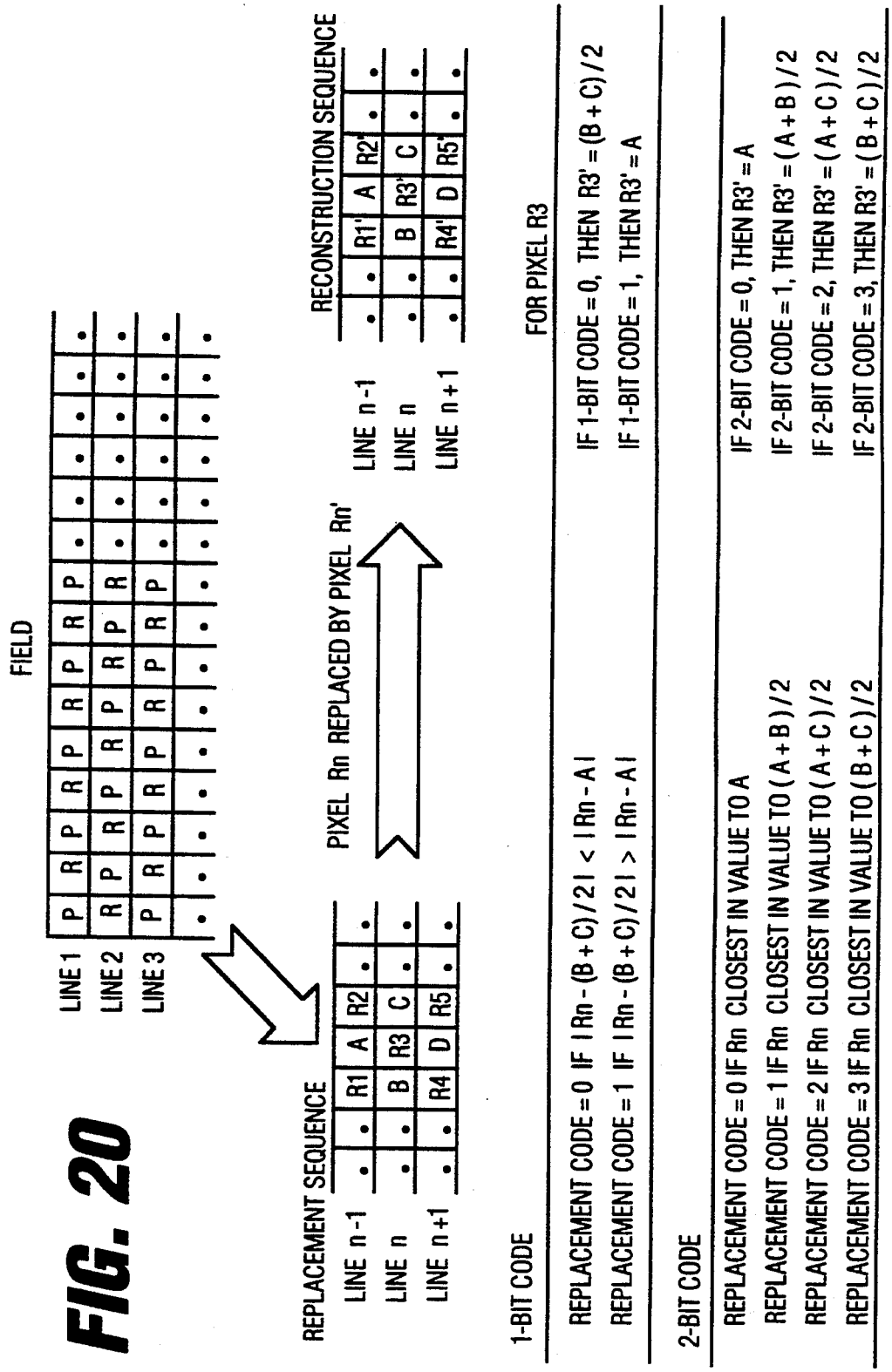
FIG. 20 is a table useful for explaining yet another alternative for implementing the resolution processing circuits of FIG. 4 and FIG. 10.

An alternative to dithering for data reduction is paired pixel compression, which will be explained with reference to FIG. 20. A field is depicted at the top of FIG. 20, the field including lines 1, 2, 3, etc. The pixels of each line are represented by letters. Each pixel denoted "P" will be retained, whereas each pixel denoted "R" will be replaced. The permanent and replaced pixels are skewed by one pixel from line to line. In other words, in the odd number lines, the replaced pixels are the second, fourth, sixth, etc. In the even number lines, the replaced pixels are the first, third, fifth, etc. The two primary alternatives are to substitute for each replaced pixel either a 1 bit code or a 2 bit code. The bits for the codes are taken from the number of bits available for defining the permanent pixels. The number of bits available for defining the pixels is limited by the storage capacity of the video processor. In this case, the CPIP chip and the video RAM 350 impose a limit of an average of 4 bits per pixel. If a 1-bit code is substituted for each replaced pixel, then 7 bits are available for each permanent pixel. Similarly, if a 2-bit code is substituted for each replaced pixel, then 6 bits are available to describe each permanent pixel. In either event, each pair of successive pixels (one permanent and one replaced) requires a total of 8 bits. A total of 8 bits per pair is an average of only 4 bits per pixel. The data reduction is in the range of 6:4 to 7:4. The replacement sequence is illustrated in a portion of the field including three successive lines: n−1, n, n+1. Pixels to be replaced are designated R1, R2, R3, R4, and R5. Pixels to remain are designated A, B, C and D.

In accordance with a 1-bit coding scheme, a zero will be substituted for a replacement pixel if it is closer in value to the pixel above it than it is closer in value to the average of the pixels on each side. For the example in FIG. 20, the 1-bit replacement code for pixel R3 will be zero if the value of pixel R3 is closer to the value of the average of pixels B and C than to the value of pixel A. Otherwise, the 1-bit replacement code will be 1. When the data is reconstructed, pixel R3′ will be equal in value to the average of the values of pixels B and C if the 1-bit code is 0. If the 1-bit code is equal to 1, then the value of pixel R3′ will be the same as the value of pixel A.

A replacement and reconstruction sequence for a 2-bit code is also illustrated. For pixel R3, the 2-bit replacement code is equal to 0 if the value of R3 is closest in value to the value of pixel A. The 2-bit replacement code is equal to 1 if the value of R3 is closest in value to the average of values A and B. The 2-bit replacement code is equal to 2 fi the value of R3 is closest in value to the average of values A and C. The 2-bit replacement code is equal to 3 if the value of R3 is closest in value to the average of values B and C. The reconstruction sequence follows the replacement sequence. If the 2 bit code is 0, the value of pixel R3′ is equal to the value of A. If the 2-bit code is equal to 1, the value of pixel R3′ is equal to the average of the values of A and B. If the 2-bit code is equal to 2, the value of pixel R3′ is equal to the average of the values of pixels A and C. If the 2-bit code is equal to 3, then the value of pixel R3′ is equal to the average of the values of pixels B and C.

A 1-bit code is advantageous insofar as the permanent pixels are described with 1 bit more resolution. The 2-bit code is advantageous in that the replaced pixels are described with more resolution. Basing calculations on the values of only two lines, that is for example, n−1 and n, or n and n+1, is advantageous in minimizing the necessary line storage capacity. On the other hand, a more accurate replacement sequence might be generated if the value D is included in the calculations, but at the cost of requiring an additional line of video storage capacity. Paired pixel compression can be particularly effective for providing good horizontal and vertical resolution; in some cases, better than dithering and dedithering. On the other hand, the resolution of diagonal transitions is generally not as good as dithering and dedithering.

In accordance with an inventive arrangement, a number of data reduction and data restoration schemes will be available, including for example paired pixel compression and dithering and dedithering. Moreover, different dithering sequences involving different numbers of bits and different paired pixel compressions involving different number of bits will also be available. The particular data reduction and restoration scheme can be selected by the WSP μP in order to maximize resolution of the displayed video for each particular kind of video display format.

What is claimed is:

1. A signal processing system, comprising:
a dithering circuit, having:
means for combining a dither signal and an n-bit video signal of digital samples; and,
means for truncating the least significant bits of each said sample; and,
a dedithering circuit, having:
means for delay and amplitude matching defining a first of two parallel signal paths for said dithered, truncated video signal;
bandpass amplifying and limiting means defining a second of said two paths for said dithered, truncated video signal; and,
means for adding outputs of said two paths to generate an at least partially dedithered n-bit video signal.

2. The system of claim 1, wherein said dither signal is any repetitive sequence of the numbers 0, 2, 1, 3.

3. The system of claim 1, wherein said truncating means truncates the one least significant bit from each said sample and said output of said second of said two paths supplies a new least significant bit for said at least partially dedithered video signal.

4. The system of claim 1, wherein said truncating means truncates at least two least significant bits from each said sample and said first of said two paths further comprises means for generating at least two new least significant bits having values determined by said output of said second of said two paths.

5. A signal processing system, comprising:
a dithering circuit, having:
means for combining a dither signal with an n-bit video signal of digital samples; and,
means for truncating the least significant bits of each said sample; and,
a dedithering circuit, having:
a first of two parallel signal paths for said dithered, truncated video signal defined by delay and amplitude matching means;
a second of said two paths for said dithered, truncated video signal defined by bandpass filtering means tuned to a frequency characteristic of said dither signal and by limiting means; and,
means for adding outputs of said two paths to generate an at least partially dedithered n-bit video signal.

6. The system of claim 5, wherein said dither signal has a response characteristic defined by at least one frequency component and said bandpass filtering means is tuned to said at least one frequency component.

7. The system of claim 5, wherein said dither signal has a response characteristic defined by at least two frequency components having relatively higher and lower frequencies and said bandpass filtering means is tuned to said lower of said at least two frequency components.

8. The system of claim 5, wherein said dither signal has a response characteristic defined by a quarter-sampling-frequency component and a half-sampling-frequency component and said bandpass filtering means is tuned to said quarter-sampling-frequency component.

9. The system of claim 5, wherein said bandpass filtering means in said second of said two paths comprises inverted bandpass filtering means.

10. The system of claim 5, wherein said second of said two paths comprises two bandpass filters and a limiter disposed between said two bandpass filters.

11. A dithering and dedithering system, comprising:
   means for adding a dither signal to an n-bit video signal of digital samples;
   means for truncating the least significant bits of each said sample;
   means for propagating said dithered, truncated video signal;
   a first signal path for said propagated video signal defined by delay and amplitude matching means;
   a second signal path for said propagated video signal defined by bandpass filtering means and limiting means; and,
   means for adding outputs of said first and second signal paths to generate an at least partially dedithered n-bit video signal.

12. The system of claim 11, wherein said dither signal has a response characteristic defined by at least one frequency component and said bandpass filtering means is tuned to said at least one frequency component.

13. The system of claim 11, wherein said dither signal has a response characteristic defined by at least two frequency components having relatively higher and lower frequencies and said bandpass filtering means is tuned to said lower of said at least two frequency components.

14. The system of claim 11, wherein said bandpass filtering means in said second signal path comprises inverted bandpass filtering means.

15. The system of claim 11, wherein said second signal path comprises two bandpass filters and a limiter disposed between said two bandpass filters.

16. The system of claim 11, wherein said means for propagating said dithered, truncated video signal has a transmission capacity less than n bits.

17. The system of claim 11, wherein said truncating means truncates the one least significant bit from each said sample and said output of said second signal path supplies a new least significant bit for said at least partially dedithered video signal.

18. The system of claim 11, wherein said truncating means truncates at least two least significant bits from each said sample and said first signal path further comprises means for generating at least two new least significant bits having values determined by said output of said second signal path.

* * * * *